(12) United States Patent
Prothero

(10) Patent No.: US 10,686,635 B2
(45) Date of Patent: *Jun. 16, 2020

(54) SPIRAL POLYNOMIAL DIVISION MULTIPLEXING

(71) Applicant: Astrapi Corporation, Dallas, TX (US)

(72) Inventor: Jerrold Prothero, Washington, DC (US)

(73) Assignee: Astrapi Corporation, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/116,368

(22) Filed: Aug. 29, 2018

(65) Prior Publication Data

US 2019/0013974 A1    Jan. 10, 2019

Related U.S. Application Data

(63) Continuation of application No. 15/255,944, filed on Sep. 2, 2016, now Pat. No. 10,069,664.
(Continued)

(51) Int. Cl.
*H04L 27/26*    (2006.01)
*H04L 27/00*    (2006.01)
(Continued)

(52) U.S. Cl.
CPC .............. *H04L 27/00* (2013.01); *H04L 27/26* (2013.01); *H04L 27/2614* (2013.01);
(Continued)

(58) Field of Classification Search
CPC . H04L 27/2656; H04L 27/2655; H04L 27/00; H04L 27/2614
(Continued)

(56) References Cited

U.S. PATENT DOCUMENTS 3,204,034 A    8/1965    Ballard et al.
3,384,715 A    5/1968    Higuchi et al.
(Continued)

FOREIGN PATENT DOCUMENTS

WO    2011/084280 A1    7/2011
WO    2012/066383 A1    5/2012

OTHER PUBLICATIONS

The International Search Report and the Written Opinion of the International Searching Authority dated Nov. 29, 2016, in connection with corresponding International Application No. PCT/US2016/050202, filed Sep. 2, 2016 12 pgs.).
(Continued)

*Primary Examiner* — Emmanuel Bayard
(74) *Attorney, Agent, or Firm* — Maier & Maier, PLLC

(57) ABSTRACT

A method for communicating using polynomial-based signals. In such a method, a set of basis polynomial functions used to generate waveforms may be identified, wherein each of the basis polynomial functions in the set of basis polynomial functions is orthogonal to each of the other basis polynomial functions in the set of basis polynomial functions in a coordinate space. The set of basis polynomial functions may be combined into a message polynomial. The message polynomial may be convolved with a reference polynomial to produce a transmission polynomial. From the transmission polynomial, a sequence of amplitude values may be generated. Finally, a signal may be transmitted based on the sequence of amplitude values, which may be further modified based on, for example, instantaneous spectral analysis. In some embodiments, orthogonal polynomials may include Chebyshev or Cairns polynomials.

21 Claims, 31 Drawing Sheets

Related U.S. Application Data

(60) Provisional application No. 62/213,418, filed on Sep. 2, 2015.

(51) Int. Cl.
  *H04L 27/34* (2006.01)
  *H04L 27/02* (2006.01)

(52) U.S. Cl.
  CPC ...... *H04L 27/2639* (2013.01); *H04L 27/2655* (2013.01); *H04L 27/34* (2013.01); *H04L 27/02* (2013.01)

(58) Field of Classification Search
  USPC .................................................. 375/295–298
  See application file for complete search history.

(56) References Cited

U.S. PATENT DOCUMENTS

| | | | | |
|---|---|---|---|---|
| 5,034,911 | A * | 7/1991 | Rachels | G06F 7/552 708/403 |
| 7,146,324 | B2 * | 12/2006 | Den Brinker | G10L 19/02 704/500 |
| 10,069,664 | B2 * | 9/2018 | Prothero | H04L 27/00 |
| 2002/0122505 | A1 | 9/2002 | Avidor et al. | |
| 2003/0026357 | A1 | 2/2003 | Bartlett et al. | |
| 2004/0174737 | A1 * | 9/2004 | Graffouliere | G11B 7/007 365/154 |
| 2004/0230387 | A1 | 11/2004 | Bechhoefer | |
| 2005/0071742 | A1 | 3/2005 | Balinsky | |
| 2008/0130714 | A1 | 6/2008 | Wilborn | |
| 2012/0263031 | A1 | 10/2012 | Prothero et al. | |
| 2013/0305120 | A1 | 11/2013 | Torii et al. | |
| 2015/0156049 | A1 | 6/2015 | Prothero | |

OTHER PUBLICATIONS

I. Kvecher, et al., "An Analog Modulation Using a Spiral Mapping", 2006 IEEE 24th Convention of Electrical and Electronics Engineers in Israel, pp. 194-198 (5 pgs.).
European Search Report dated Apr. 2, 2019, in connection with corresponding EP Application No. 16843110.4 (12 pgs.).
Dr. Jerrold Prothero, "The Shannon Law for Non-Periodic Channels", Technical Report, ASTRAPI Exponential Communication, Mar. 2, 2012, 30 pgs. (XP055360929).
Konrad Piwnicki, "Modulation Methods Related to Sine-Wave Crossings", IEEE Transactions on Communications, vol. COM-31, No. 4, Apr. 1983, pp. 503-508 (6 pgs.).
Jerrold Prothero, Ph.D., "Euler's Formula for Fractional Powers of i", Chapters 1-8, Apr. 15, 2017, 72 pgs.
Canadian Office Action dated Apr. 22, 2020, in connection with corresponding CA Application No. 3,034,804 (4 pgs.).

* cited by examiner

```
% Generate random Taylor poly of arbitrary positive integer degree
degree              = 25;           % Arbitrary polynomial degree
n_idx               = degree:-1:0;  % Powers of all poly terms
nfact_reciprocal    = 1./factorial(n_idx);
Taylor_coefficients = 20*(rand(1,degree+1)-0.5);  % Rand Taylor poly
our_poly            = Taylor_coefficients .* nfact_reciprocal;
```

Figure 25

```
% Example:
%   The polynomial coefficients row vector [3/3! 2/2! 1 0]
%   will be returned as                    [3    2    1 0]
[rows, len]         = size(poly_coefficients);
Taylor_coefficients = zeros(rows, len);
for r=1:rows
    idx                     = 0:len-1;
    facts                   = factorial(idx);
    descending_facts        = fliplr(facts);
    Taylor_coefficients(r,:) = poly_coefficients(r,:) .* descending_facts;
end
```

Figure 26

```
% Find polynomial degree+1
[~,len] = size(Taylor_vec);

% Cairns functions increase by powers of two
M = nextpow2(len);

% If necessary, pad Taylor coefficient vector to be right length
if len ~= 2^M
    if len > 2^M
        error('Internal error');
    end
    % Pad to right degree
    new_Taylor_vec                  = zeros(1,2^M);
    pad_by                          = 2^M - len;
    new_Taylor_vec(1,1:pad_by)      = 1/realmax;
    new_Taylor_vec(1,pad_by+1:end)  = Taylor_vec;
    Taylor_vec                      = new_Taylor_vec;
end
```

Figure 27

```
% Number of terms in Cairns function Taylor series approximation
len = 2^M;

% Normalization coefficient for each row
norm_vec = zeros(1,len);

% Find normalization coefficients
this_row = 1;
for m = 0:M                           % Over all levels
    for n = 0:ceil(2^(m-1))-1         % Over all functions at this level
        % Specify the non-zero elements for this row
        step_size    = ceil(2^(m-1));              % Dist between non-zeros
        num_non_zero = floor(len/step_size);       % # of non-zero entries
        norm_vec(this_row) = 1/sqrt(num_non_zero); % Each row magnitude 1
        this_row = this_row +1;
    end
end
```

Figure 28

```
% Compute the projection matrix in ascending degree
proj_matrix = zeros(len);
this_row = 1;
for m = 0:M                           % Over all levels
    for n = 0:ceil(2^(m-1))-1         % Over all functions at this level
        % Specify the non-zero elements for this row
        step_size    = ceil(2^(m-1));              % Distance between non-zeros
        if m==0
            row_idx = 1;
        else
            row_idx = 2^(m-1) + n + 1; % +1 because rows start at 1, not 0
        end
        norm_by      = norm_vec(1,row_idx);
        num_non_zero = floor(len/step_size); % Number of non-zero entries
        for q = 0:num_non_zero-1;
            proj_matrix(this_row, q*step_size +n +1) = ...
                (-1)^(q*ceil(2^(1-m)))*norm_by;
        end
        this_row = this_row +1;
    end
end % Convert to descending degree, for consistency with MATLAB convention
proj_matrix = fliplr(proj_matrix);
```

Figure 29

```
% Determine Cairns space projection coefficients for input polynomial
proj_coeffs = proj_matrix * Taylor_vec';
proj_coeffs = proj_coeffs';
```

Figure 30

```
% Effectively, the below reconstructs the input from the E(m,n); but in
% order to pull the frequency information out, we are summing across
% n-values. The projection coefficients we are using (Cmn, below) come from
% projecting onto normalized Psi(m,n) functions. So we need to normalize
% the E(m,n) in the same way, using the projection normalization
% coefficients.
proj_norm = compute_norm_coefficients(M);

this_freq_idx = 1;
for m=0:M    % Over all m-levels
    max_n  = ceil(2^(m-1))-1;    % Cairns functions at this level
    max_p  = ceil(2^(m-1))-1;    % Frequencies at this m-level
    m_norm = 1/ceil(2^(m-1));    % m-level normalization factor
    for p=0:max_p       % Over all frequencies
        freq_idx(1,this_freq_idx) = sin(pi*(2*p+1)*2^(1-m));
        sum_this_p = 0;
        for n=0:max_n   % Over all functions at this m-level
            Cmn   = proj_coeffs(1,mn_to_row_index(m,n));  % Our proj coeff
            phase = 1j^(-n*(2*p+1)*2^(2-m));
            amp   = exp(t*cos(pi*(2*p+1)*2^(1-m)));
            sum_this_p = sum_this_p + Cmn*phase*amp;
        end
        idx = mn_to_row_index(m,0);
        freq_amp(1,this_freq_idx) = sum_this_p * m_norm * proj_norm(1,idx);
        this_freq_idx = this_freq_idx+1;
    end
end
```

Figure 31

```
if m==0
    row_index = 1;
else
    row_index = 2^(m-1) + n + 1;    % +1 because rows start at 1, not 0
end
```

Figure 32

```
% The frequency information overlaps across m-levels, so sort
[freq_idx,sort_idx] = sort(freq_idx);
freq_amp             = freq_amp(sort_idx);
```

Figure 33

```
%% Combine paired frequency information
% Aside from the sinusoidals (which appear first & last in the sorted
% list), all frequencies have two amplitude entries at this point, because
% for every rising real-valued exponential coefficient to a given frequency
% there is a falling real-valued exponential coefficient to the same
% frequency. We want to combine the rising and falling exponential
% information into a single factor by adding adjacent entries, other than
% first and last.

% Define shortened vectors that we will collapse into
[~,len]        = size(freq_idx);
short_len      = floor(len/2 +1);
short_freq_idx = zeros(1,short_len);
short_freq_amp = zeros(1,short_len);

% Copy sinusoidal information in from ends
short_freq_idx(1,1)   = freq_idx(1,1);
short_freq_idx(1,end) = freq_idx(1,end);
short_freq_amp(1,1)   = freq_amp(1,1);
short_freq_amp(1,end) = freq_amp(1,end);

% Combine adjacent pairs
long_idx = 2;
for short_idx=2:short_len-1;
    short_freq_idx(1,short_idx) = freq_idx(1,long_idx);
    short_freq_amp(1,short_idx) = freq_amp(1,long_idx ) + ...
                                  freq_amp(1,long_idx+1);
    long_idx = long_idx+2;
end
```

Figure 34

```
% Integrity check. The frequency information should be able to reconstruct
% the value of the polynomial at the specified time.
poly_at_t = polyval(poly_vec,t);      % Time-domain value
if abs(poly_at_t) > 0.00000001        % Ratio error doesn't work if zero
    our_sum = 0;                      % Reconstruct from freq domain
    for short_idx = 1:short_len
        amp     = short_freq_amp(1,short_idx);
        freq    = short_freq_idx(1,short_idx);
        our_sum = our_sum + amp*exp(1j*t*freq);
    end
    reconstruction_error = abs(our_sum - poly_at_t);
    percent_error        = 100*reconstruction_error/abs(our_sum);
    if percent_error > 1
        poly_vec
        short_freq_idx
        short_freq_amp
        t
        poly_at_t
        our_sum
        reconstruction_error
        percent_error
        error('Reconstruction error greater than 1%');
    end
end
```

Figure 35

SPIRAL POLYNOMIAL DIVISION MULTIPLEXING

CROSS-REFERENCE TO RELATED APPLICATIONS

This application claims priority from U.S. patent application Ser. No. 15/255,944, filed on Sep. 2, 2016, entitled "Spiral Polynomial Division Multiplexing", U.S. Provisional Patent Application No. 62/213,418, filed on Sep. 2, 2015, entitled "Spiral Polynomial Division Multiplexing," and from U.S. Provisional Patent Application No. 62/256,532, filed on Nov. 17, 2015, entitled "Method for Determining Instantaneous Spectral Usage," the entire contents of which are hereby incorporated by reference.

BACKGROUND

Applicant's prior U.S. Pat. No. 8,472,534 entitled "Telecommunication Signaling Using Non-Linear Functions" and U.S. Pat. No. 8,861,327 entitled "Methods and Systems for Communicating", the contents of which are herein incorporated by reference in their entirety, introduced spiral-based signal modulation. Spiral-based signal modulation may base signal modulation on complex spirals, rather than the traditional complex circles used by standard signal modulation techniques such as Quadrature Amplitude Modulation (QAM) and Phase-Shift Keying (PSK).

Multiplexing refers to the combination of multiple digital data streams or sub-channels into a single signal for communication over a shared channel. In the context of wireless communication, multiplexing provides a means to share an expensive resource, spectrum. Additionally, breaking a channel into sub-channels may facilitate resistance to channel impairments such as fading.

Any multiplexing technique requires a method for the multiplexer (MUX) in the transmitter to combine sub-channels into a single signal, and for the demultiplexer (DMX) in the receiver to reverse the process to obtain the original data streams.

Existing well-known and widely-deployed multiplexing methods include Code-Division Multiplexing (CDM), Orthogonal Frequency-Division Multiplexing (OFDM), and Time-Division Multiplexing (TDM). However, in all cases, these underlying sub-channel signal modulation techniques are based on sinusoidals. The overall framework is that sub-channel sinusoidal modulations are combined into a higher-level sinusoidal modulation in the common channel.

SUMMARY

According to an exemplary embodiment, a modulation scheme that is polynomial-based rather than sinusoidal-based may be disclosed.

Applicant's prior patents noted above disclosed an exemplary implementation of spiral modulation in which spiral-based symbol waveforms were formed through multiplying a complex circle by a rising exponential (the "head function") for part of the symbol time, optionally connected to a "tail function" that returned the amplitude to its original value. The intra-symbol amplitude variation was therefore defined, at least for the "head function" portion of the symbol time, by the properties of an exponential.

According to an exemplary embodiment, a method for communicating may be disclosed. Such a method may include: identifying a set of basis polynomial functions used to generate waveforms, wherein each of the basis polynomial functions in the set of basis polynomial functions is orthogonal to each of the other basis polynomial functions in the set of basis polynomial functions in a coordinate space; combining the set of basis polynomial functions into a message polynomial; convolving the message polynomial with a reference polynomial to produce a transmission polynomial; generating, from the transmission polynomial, a sequence of amplitude values; and transmitting, with a transmitter, a signal based on the sequence of amplitude values. In some embodiments, orthogonal polynomials may include Chebyshev or Cairns polynomials.

In an embodiment, the method may further include converting, using instantaneous spectral analysis, a sequence of amplitude values into a set of sinusoidals with continuously-varying amplitude; and generating the signal based on the sequence of amplitude values by combining the set of sinusoidals with continuously-varying amplitude. In an embodiment, the step of converting using Instantaneous Spectral Analysis (ISA) may entail projecting a transmission polynomial onto the Cairns series functions; converting the polynomial from a function described by the Cairns series functions to a function described by the Cairns exponential functions; and combining, into a sum of sinusoidals with continuously time-varying amplitudes, frequency information contained within the function described by the Cairns exponential functions. (In another embodiment, for example an embodiment in which the transmission polynomial is not known or not accessible to a device implementing ISA, the step of converting using ISA may further include fitting a transmission polynomial to a sequence of amplitude values.)

In an embodiment, the method may further include polynomial-based synchronization using full-power synchronization, limited-power synchronization, or no-power synchronization, where the power level may refer to the amount of available signal power devoted exclusively to synchronization over some period of time. The method may further include performing dimension reduction to mitigate coherent interference rejection or to reduce Peak-to-Average Power Ratio (PAPR).

In another embodiment, a communication, such as might be sent via the first method, may be received and decoded using another method. Such a method may include receiving a signal with a receiver, the signal having a plurality of sub-channels and including a sequence of amplitude values; and demultiplexing the signal. The step of demultiplexing the signal may include fitting a reconstructed transmission polynomial to the sequence of amplitude values; deconvolving, from the reconstructed transmission polynomial, a reference polynomial, yielding a transmitted message polynomial; determining, by orthogonal projection of the transmitted message polynomial into a polynomial coefficient space, a plurality of sub-channel amplitudes of the signal; generating a combined bit sequence of the signal by mapping the plurality of sub-channel amplitudes into bit sequences and combining the bit sequences; and outputting the combined bit sequence.

In another exemplary embodiment, each of the method for sending and the message for receiving communications may be embodied on a particular system or particular apparatus. Such a system may include a spiral polynomial division multiplexer and a transmitter, the spiral polynomial division multiplexer being configured to: identify a set of basis polynomial functions used to generate waveforms, wherein each of the basis polynomial functions in the set of basis polynomial functions is orthogonal to each of the other basis polynomial functions in the set of basis polynomial functions in a coordinate space; combine the set of basis polynomial functions into a message polynomial; convolve the message polynomial with a reference polynomial to produce a transmission polynomial; and generate, from the transmission polynomial, a sequence of amplitude values. The transmitter may be configured to transmit a signal based on the sequence of amplitude values.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals FIG. 1 may show an exemplary plot of a Cairns function having a rising exponential.

FIG. 25 may show exemplary MATLAB code for the generation of a random polynomial.

FIG. 26 may show exemplary MATLAB code for the conversion of a polynomial to a Taylor polynomial.

FIG. 27 may show exemplary MATLAB code for zero-padding a Taylor polynomial.

FIG. 28 may show exemplary MATLAB code for generating normalization coefficients.

FIG. 29 may show exemplary MATLAB code for generating a Cairns projection matrix.

FIG. 30 may show exemplary MATLAB code for projecting a Taylor polynomial onto Cairns space.

FIG. 31 may show exemplary MATLAB code for determining amplitude values.

FIG. 32 may show exemplary MATLAB code for finding a row index.

FIG. 33 may show exemplary MATLAB code for sorting frequencies.

FIG. 34 may show exemplary MATLAB code for combining amplitude pairs.

FIG. 35 may show exemplary MATLAB code for reconstructing a time domain.

DETAILED DESCRIPTION OF THE EMBODIMENTS

Figure 1:
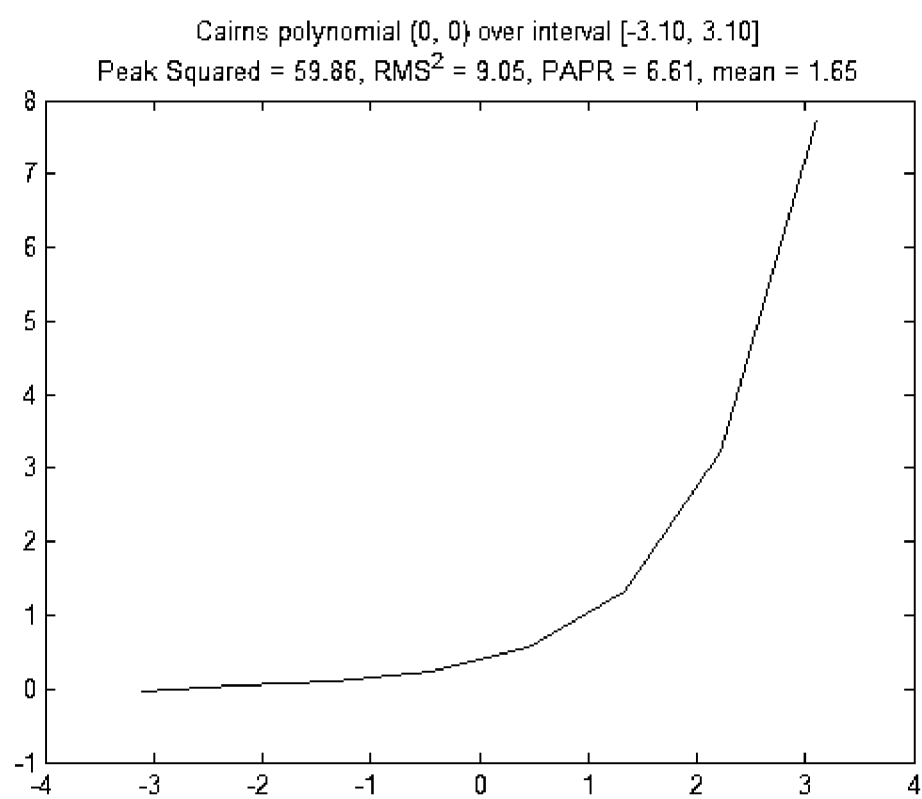
Figure 2:
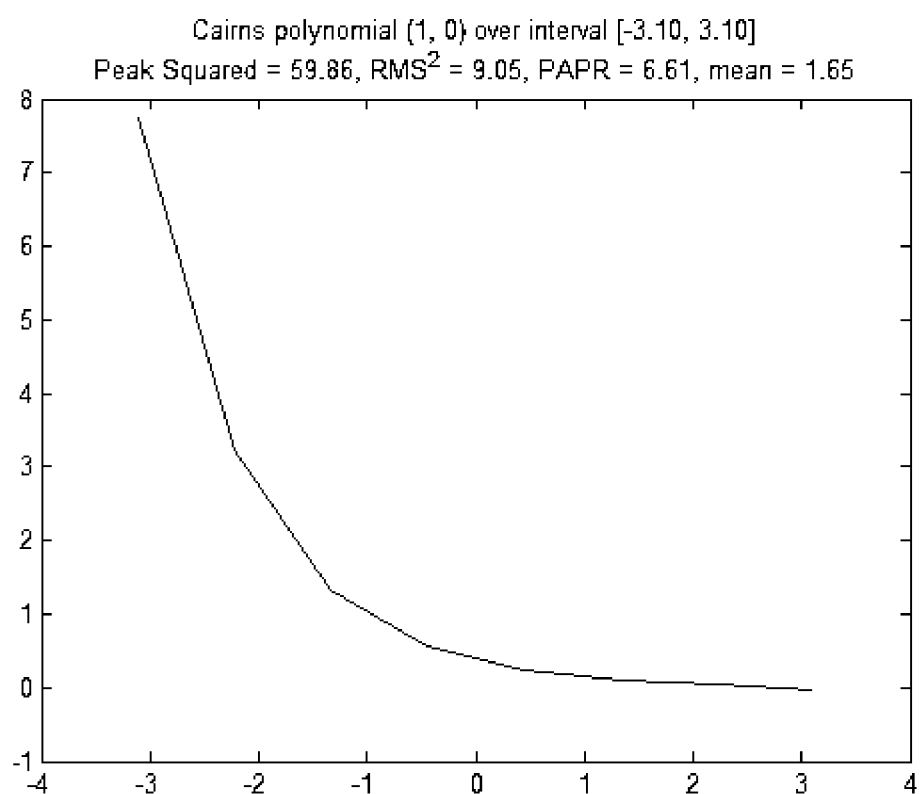
FIG. 2 may show an exemplary plot of a Cairns function having a falling exponential.
Figure 3:
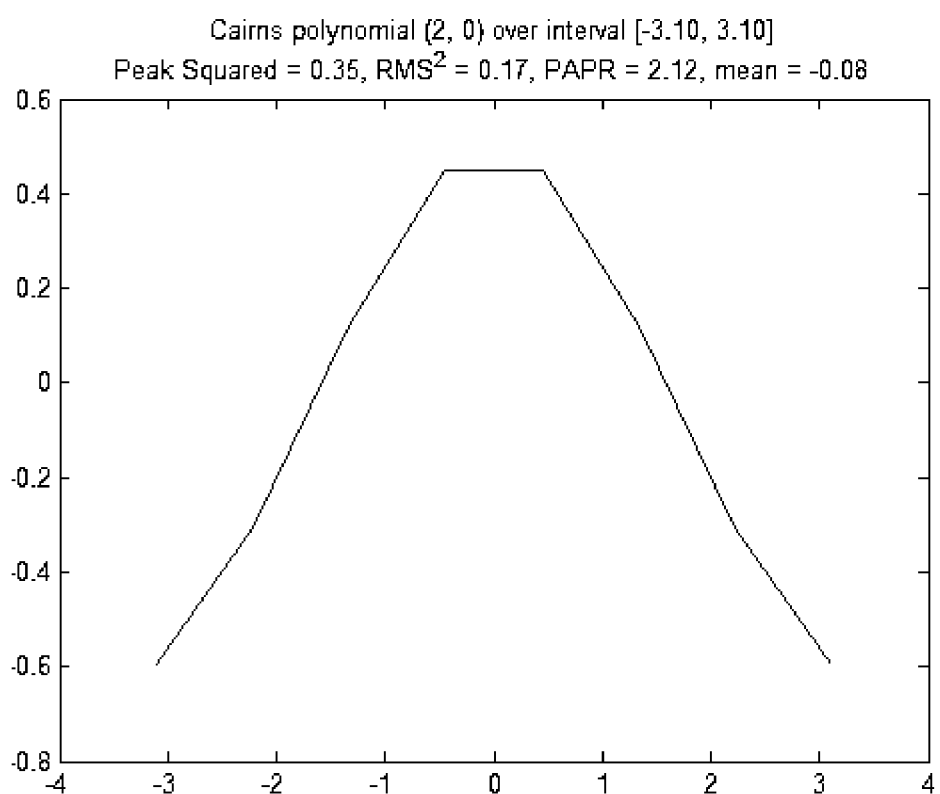
FIG. 3 may show an exemplary plot of a Cairns series function.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

According to an exemplary embodiment, a method for spiral polynomial division multiplexing (SPDM) may be described. In an exemplary embodiment, a SPDM multiplexer may be based on amplitude modulation of a set of basis polynomials, or sub-channels, that cover all polynomials of a given degree. According to an exemplary embodiment, SPDM sub-channels may not modulate sinusoidals. Instead, SPDM sub-channels may (amplitude) modulate component polynomials which are orthogonal to each other in the time domain or in the polynomial coefficient space.

In an exemplary embodiment, the basis polynomials may be orthogonal in the time domain; for example, in some embodiments, the basis set may be the Chebyshev polynomials. In other embodiments, the basis polynomials may be orthogonal in the polynomial coefficient space; for example, in some exemplary embodiments, the basis set may be Cairns polynomials.

In an exemplary embodiment, the SPDM multiplexer (SPDM MUX or MUX) may combine, or may be responsible for combining, independently-modulated component polynomials into a "message polynomial", which may be convolved with a "reference polynomial" to produce a "transmission polynomial". The SPDM multiplexer may then generate a series of amplitude values from the transmission polynomial, which may then be transmitted as a signal from a transmitter.

In some embodiments, bandlimiting of a transmission may be performed by making use of Instantaneous Spectral Analysis (ISA) to limit the range of frequencies used by expressing the signal in terms of sinusoidals with continuously-varying amplitude. In an exemplary embodiment, transmissions may be limited to a range of frequencies equal to the reciprocal of the transmission duration.

According to an exemplary embodiment, upon receiving a transmission polynomial signal at a receiver, a SPDM demultiplexer (SPDM DMX or DMX) may then be configured to reverse the composition of the transmission polynomial in order to identify the sub-channel information.

In some exemplary embodiments, a SPDM DMX may use one of the following approaches. In a first approach, if the basis polynomials are Cairns polynomials, a polynomial can be fit to the received amplitude values to reconstruct the transmission polynomial, then sub-channel amplitudes can be determined by orthogonal projection in the polynomial coefficient space. In a second approach, for the Cairns or other basis polynomial sets, a SPDM DMX may build templates for the amplitude sequence generated by all possible transmission polynomials, then apply a standard minimum distance metric to identify a received transmission polynomial, from which the sub-channel amplitudes can be determined by table lookup. In other exemplary embodiments, another method of SPDM demultiplexing may also be used, if desired.

Certain advantages may be understood for SPDM multiplexing as compared to other multiplexing methods. For example, as compared to other multiplexing methods in widespread use, SPDM may offer high spectral efficiency. The combination of SPDM with ISA may allow polynomials of arbitrarily high degree to be transmitted with a very low bandwidth transmission time or bandwidth delay product, such as a bandwidth transmission time product (BT) equal to one. Since a polynomial of degree D is equivalent to D+1 independent amplitude values, this makes it possible to exceed the Nyquist rate (which arises from the sampling theorem, proven under the assumption that sinusoidals have constant amplitude over an evaluation interval). Increasing the rate at which independent amplitude values can be transmitted using a fixed frequency range can be used in principle to push spectral efficiency to unprecedentedly high levels.

In some other exemplary embodiments, depending on configuration, other potential advantages of SPDM may include very precise and robust synchronization and power normalization and a very large and flexible waveform design space that can be used to reject coherent interference or for other applications. In some exemplary embodiments, SPDM may not be dependent on and may not require sinusoidal orthogonality.

For example, in an exemplary embodiment of a SPDM system, an advantage of the SPDM system may be that very precise time synchronization may be possible with limited overhead in terms of bandwidth, power, and time by making use of the properties of polynomials. For example, in some exemplary embodiments, for example exemplary embodiments above certain noise levels, less than 1% error may be achieved in a single Transmission Time Interval (TTI). In some exemplary embodiments, for relatively low-impairment channels, very precise time synchronization may be achieved without any reduction to traffic (user data throughput) or increase in bandwidth usage.

In another exemplary embodiment of a SPDM system, SPDM synchronization may be sufficiently robust that for one-to-one communication it opens the possibility of deliberately desynchronizing the channel on a per-TTI basis and using the overall channel timing as an additional modulation parameter, before the sub-channels are analyzed. This may further improve throughput, if desired.

In another exemplary embodiment of a SPDM system, a SPDM system may offer precise and robust power normalization. An exemplary embodiment of an SPDM system may allow for new techniques to be used to enforce PAPR limits.

In another exemplary embodiment of a SPDM system, a SPDM system may have a huge and flexible waveform design space, since the basis polynomials cover the space of all polynomials of a given degree. In some exemplary embodiments, waveform sets may be designed, based on this design space, specifically to reject coherent interference, or for other purposes, as may be desired.

Lastly, in another exemplary embodiment of a SPDM system, an SPDM system may be implemented without the need for any frequency alignment or sinusoidal orthogonality requirements, which may be accomplished based on the fact that SPDM is not based on sinusoidals.

However, some embodiments of SPDM may also be computationally intensive, in that they may benefit from sampling above the Nyquist rate and analyzing the resulting data. In some exemplary embodiments, SPDM systems may also be reliant on the accuracy of fitting a polynomial to noisy amplitude values (for example, according to an exemplary embodiment wherein the SPDM DMX uses a polynomial fit), and/or have high numerical precision sensitivity. For example, in an exemplary embodiment, SPDM may use Taylor polynomials, which have coefficients proportional to the inverse factorial of the polynomial degree. For high-degree polynomials, this may require accurately processing a very wide range of numerical magnitudes.

Mathematical Background

In the following section, a discussion of some of the mathematics that may serve as a basis for understanding a SPDM multiplexing and demultiplexing system may be provided. Certain summaries and proofs of these mathematics may be available in other documents. See, for example, Jerrold Prothero, *The Shannon law for non-periodic channels*, Astrapi Technical Report R-2012-1 (2012), available at http://www.astrapi-corp.com/technology/white-papers/, and Jerrold Prothero, *Euler's formula for fractional powers of I* (2007), available at http://www.astrapi-corp.com/technology/white-papers/, the contents of which are incorporated by reference.

To summarize, SPDM may make use of polynomial coefficient projection onto Cairns space as the basis for composing from and decomposing into sub-channels.

The familiar Euler's formula $$e^{it} = \cos(t) + i \cdot \sin(t) \qquad (1)$$

can be generalized by raising the imaginary constant i on the left side to fractional powers. The new term $$e^{ti(2^{2-m})} \qquad (2)$$

reduces to the standard Euler's term in the special case m=2. Table 1 shows the generalized terms of Euler's formula for this and other positive integer values of m:

TABLE 1

Generalized Euler's Term as a Function of m

| m | 0 | 1 | 2 | 3 | 4 | 5 | ... |
|---|---|---|---|---|---|---|---|
| $e^{ti(2^{2-m})}$ | $e^t$ | $e^{-t}$ | $e^{it}$ | $e^{ti(1/2)}$ | $e^{ti(1/4)}$ | $e^{ti(1/8)}$ | ... |

The standard Euler's formula, shown in equation (1), can be proved by expanding $e^{it}$ as a Taylor series and grouping real and imaginary terms. The same procedure can also be used for the term in (2) to derive a generalization of Euler's formula for integer m≥0:

$$e^{ti(2^{2-m})} = \sum_{n=0}^{\lceil 2^{m-1} \rceil - 1} i^{n2^{2-m}} \psi_{m,n}(t) \qquad (3)$$

Where $$\psi_{m,n}(t) = \sum_{q=0}^{\infty} (-1)^{q \cdot \lceil 2^{1-m} \rceil} \cdot \frac{t^{q \cdot \lceil 2^{m-1} \rceil + n}}{(q \cdot \lceil 2^{m-1} \rceil + n)!} \qquad (4)$$

The $\psi_{m,n}(t)$ are called the "Cairns series functions".

Notice that $\psi_{2,0}(t)$ and $\psi_{2,1}(t)$ give us the Taylor series for the standard cosine and sine functions, respectively.

Each value of m produces a "level" of functions $\psi_{m,n}(t)$. From the summation limits in Equation 3, it can be seen that each level has a total of $\lceil 2^{m-1} \rceil$ functions. Table 2 shows the progression of m versus the number of functions at each level of m.

TABLE 2

Number of Functions at Each m-Level

| Level (m-value) | 0 | 1 | 2 | 3 | 4 | 5 | ... |
|---|---|---|---|---|---|---|---|
| Number of functions | 1 | 1 | 2 | 4 | 8 | 16 | ... |

An important property of the $\psi_{m,n}(t)$ is the regular pattern of their coefficients. This regular pattern is shown in Table 3.

TABLE 3

The Cairns Series Coefficients

| | 1 | t | $\frac{t^2}{2!}$ | $\frac{t^3}{3!}$ | $\frac{t^4}{4!}$ | $\frac{t^5}{5!}$ | $\frac{t^6}{6!}$ | $\frac{t^7}{7!}$ | ... |
|---|---|---|---|---|---|---|---|---|---|
| $\psi_{0,0}(t) = e^t$ | 1 | 1 | 1 | 1 | 1 | 1 | 1 | 1 | ... |
| $\psi_{1,0}(t) = e^{-t}$ | 1 | -1 | 1 | -1 | 1 | -1 | 1 | -1 | ... |
| $\psi_{2,0}(t) = \cos(t)$ | 1 | 0 | -1 | 0 | 1 | 0 | -1 | 0 | ... |
| $\psi_{2,1}(t) = \sin(t)$ | 0 | 1 | 0 | -1 | 0 | 1 | 0 | -1 | ... |
| $\psi_{3,0}(t)$ | 1 | 0 | 0 | 0 | -1 | 0 | 0 | 0 | ... |
| $\psi_{3,1}(t)$ | 0 | 1 | 0 | 0 | 0 | -1 | 0 | 0 | ... |
| $\psi_{3,2}(t)$ | 0 | 0 | 1 | 0 | 0 | 0 | -1 | 0 | ... |
| $\psi_{3,3}(t)$ | 0 | 0 | 0 | 1 | 0 | 0 | 0 | -1 | ... |
| ... | ... | ... | ... | ... | ... | ... | ... | ... | ... |

Here, the rows indicate the Taylor series coefficients for each $\psi_{m,n}(t)$. For instance, the row for $\psi_{2,0}(t) = \cos(t)$ indicates that $$\cos(t) = 1 - \frac{t^2}{2!} + \frac{t^4}{4!} - \frac{t^6}{6!} + \ldots \qquad (5)$$

Table 3 shows that the $\psi_{m,n}(t)$ coefficients may define a set of orthogonal vectors. More precisely, if M is a positive integer, then the vectors formed from the first $2^M$ coefficients of the functions $\psi_{m,n}(t)$ for 0≤m≤M may constitute a set of orthogonal basis vectors for a $2^M$-dimensional space. These can be normalized to produce the orthonormal "$2^M$ Cairns basis vectors".

The existence of the $2^M$ Cairns basis vectors implies that any Taylor polynomial P of degree $k < 2^M$ can be orthogonally projected onto polynomials formed from the first $2^M$ terms of the Cairns series functions simply by taking the inner product of P's coefficients with the $2^M$ Cairns basis vectors. The resulting coefficients for each Cairns basis function are referred to as the "projection coefficients".

The first $2^M$ terms of the Cairns series functions $\psi_{m,n}(t)$ are only an approximation to the full infinite series expansion of the $\psi_{m,n}(t)$. However, the error in the approximation is $O(t^{(2^M)})$, with a reciprocal factorial coefficient, and therefore falls off very rapidly as M increases. For high-degree polynomials, therefore, it is reasonable to speak of projecting onto the $\psi_{m,n}(t)$ by this procedure.

It is well-known that the cosine and sine functions of Euler's formula can be represented not only by Taylor series but also by sums of complex exponentials. Explicitly:

$$\cos(t) = 1 - \frac{t^2}{2!} + \frac{t^4}{4!} - \frac{t^6}{6!} + \ldots = \frac{1}{2}(e^{it} + e^{-it}) \qquad (6)$$

and $$\sin(t) = t - \frac{t^3}{3!} + \frac{t^5}{5!} - \frac{t^7}{7!} + \ldots = \frac{1}{2i}(e^{it} - e^{-it}) \qquad (7)$$

This characteristic also holds for the generalized Euler's formula. For example, Equation (8) can be defined as the following:

$$E_{m,n}(t) = \frac{1}{\lceil 2^{m-1} \rceil} \sum_{p=0}^{\lceil 2^{m-1} \rceil - 1} i^{-n(2p+1)2^{2-m}} e^{ti(2p+1)2^{2-m}} \qquad (8)$$

Where the $E_{m,n}(t)$ are called the "Cairns exponential functions."

By expanding the right side of Equation 8 as a sum of Taylor polynomials and recursively cancelling terms, it can be shown that for all m and n $$E_{m,n}(t) = \psi_{m,n}(t) \quad (9)$$

Equation 9 tells us that once a polynomial has been projected onto the Cairns series functions, it can be immediately converted into a sum of complex exponentials. In some exemplary embodiments, this may be used to convert a polynomial into sinusoidals with continuously-varying amplitude by an SPDM MUX.

As mentioned above, the Cairns basis functions allow any Taylor polynomial (which includes any polynomial with positive integer coefficients) to be projected onto the Cairns series functions. Conversely, any weighted sum of Cairns series functions corresponds uniquely to a particular Taylor polynomial. In some exemplary embodiments, this principle may be used by an SPDM MUX and DMX to compose and decompose sub-channels. According to one exemplary embodiment of SPDM, each sub-channel may correspond to one amplitude-modulated Cairns function $\psi_{m,n}(t)$. Other exemplary embodiments of SPDM using different principles may also be understood and may be used as desired.

According to an exemplary embodiment, SPDM may be based on the Cairns functions; it may thus be worthwhile to examine the properties of Cairns functions in further detail. As the Cairns functions at level m are generated from the generalized Euler's term $$e^{ti(2^{2-m})},$$

this generalized term may be examined specifically in more detail.

By using the identity $$e^{i\pi/2} = i \quad (10)$$

which is a special case of Euler's formula, it follows that $$e^{ti(2^{2-m})} = e^{t \cdot \cos(\pi 2^{1-m})} e^{i \cdot t \cdot \sin(\pi 2^{1-m})} \quad (11)$$

On the right side of Equation (11), the first factor, $e^{t \cdot \cos(\pi 2^{1-m})}$, is a real-valued exponential; the second factor, $e^{i \cdot t \cdot \sin(\pi 2^{1-m})}$, describes a circle in the complex plane. The product of the two factors describes a spiral in the complex plane.

In Equation (11) above, m=0 generates the standard rising exponential; m=1 generates the standard falling exponential; and m=2 generates the standard sine and cosine functions.

From Equation (11), we can see that as m increases above m=2, the rate of growth increases and the rate of rotation decreases. In the limit as $$m \to \infty, e^{ti(2^{2-m})}$$

converges back to $e^t$.

At every level of m, the $\psi_{m,n}(t)$ share the growth and frequency properties of their generating term $$e^{ti(2^{2-m})}.$$

For instance, the Cairns functions with the fastest rotation (and slowest growth) occur at m=2.

Another important observation is that for m≥2 Cairns functions with even n are always symmetric around t=0, and Cairns functions with odd n are always anti-symmetric around t=0.

Figure 4:
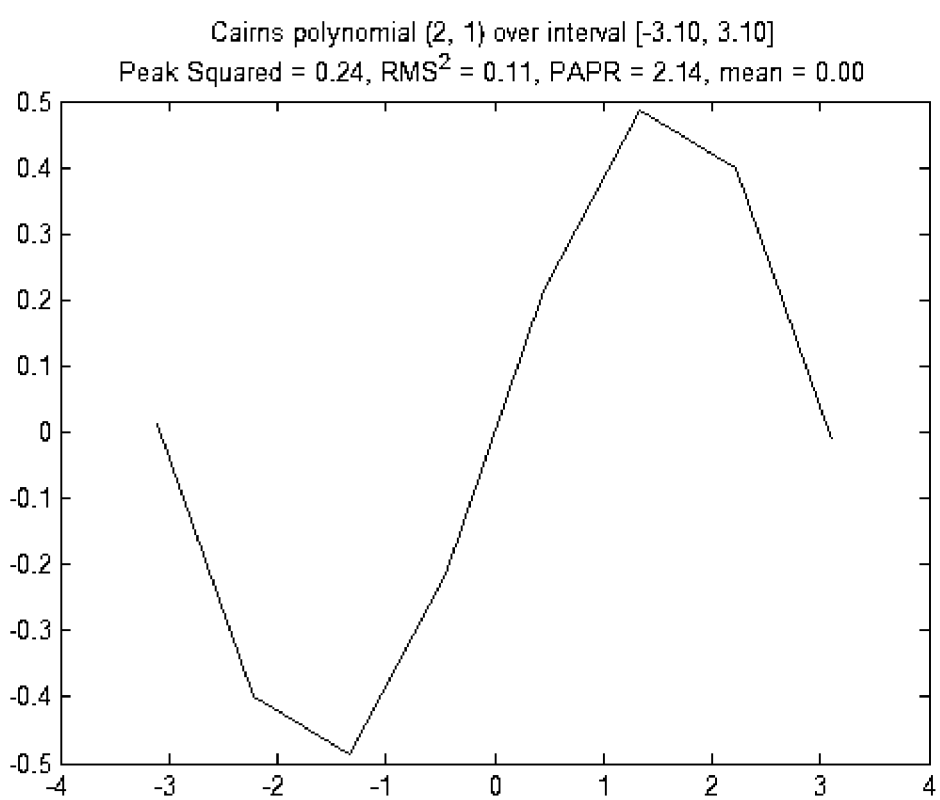
FIG. 4 may show an exemplary plot of a Cairns series function.
Figure 5:
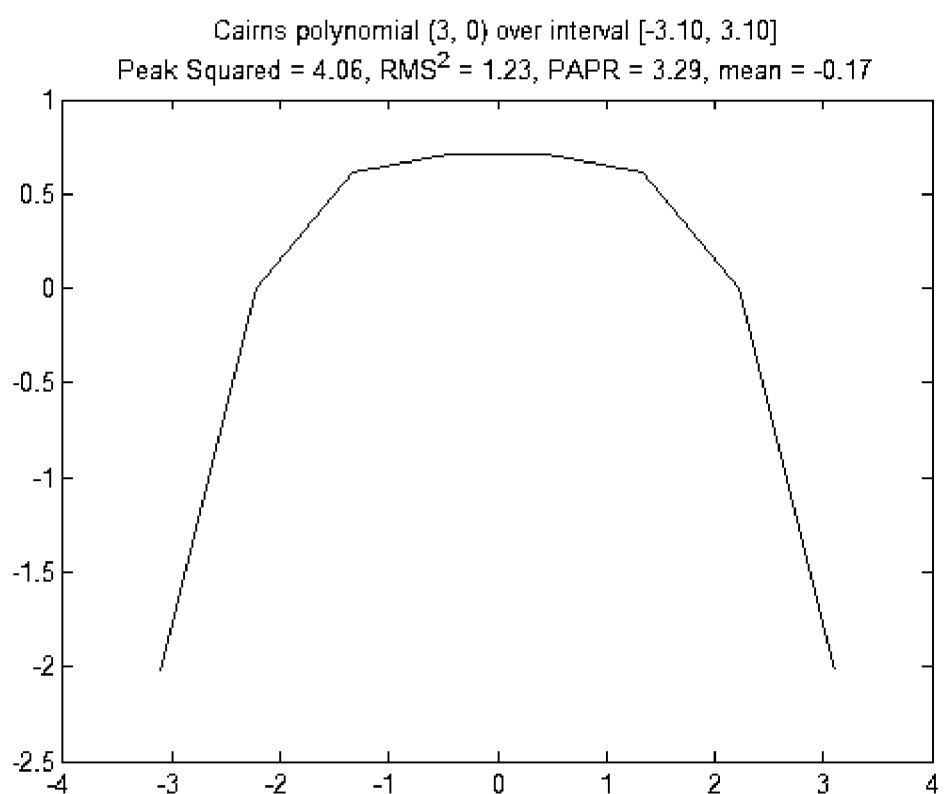
FIG. 5 may show an exemplary plot of a Cairns series function.
Figure 6:
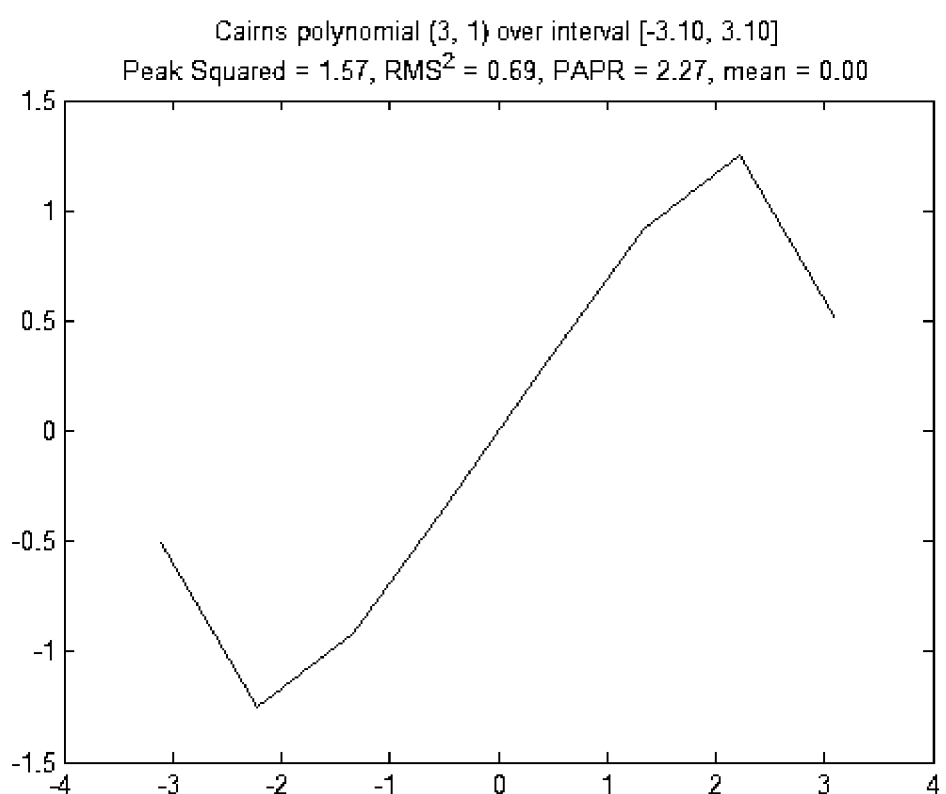
FIG. 6 may show an exemplary plot of a Cairns series function.
Figure 7:
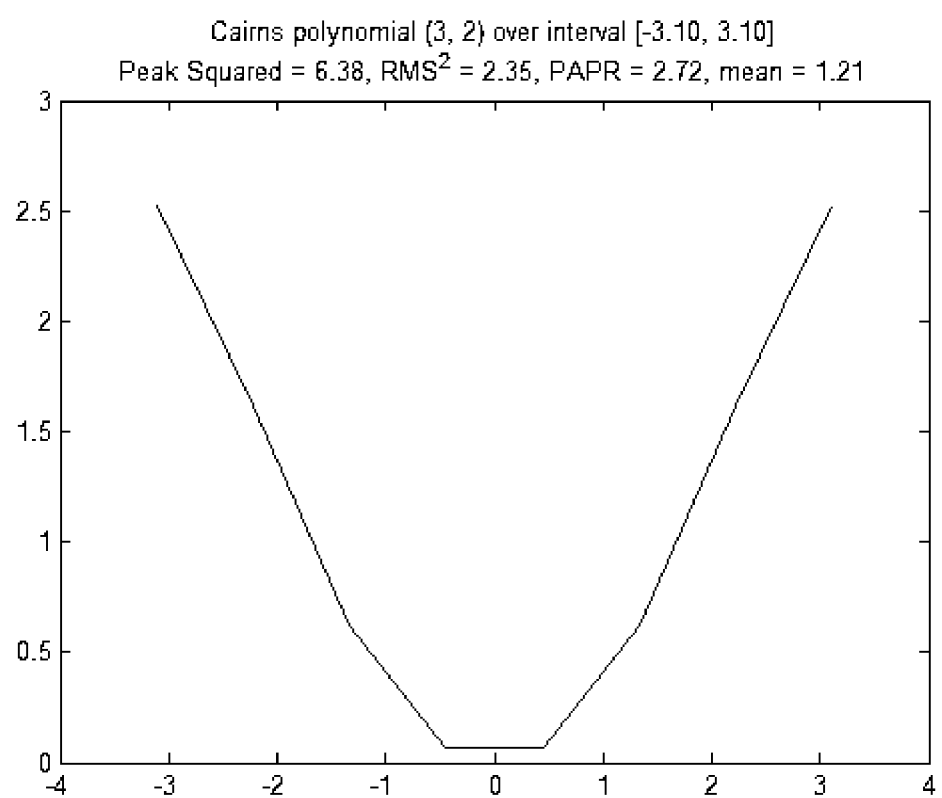
FIG. 7 may show an exemplary plot of a Cairns series function.
Figure 8:
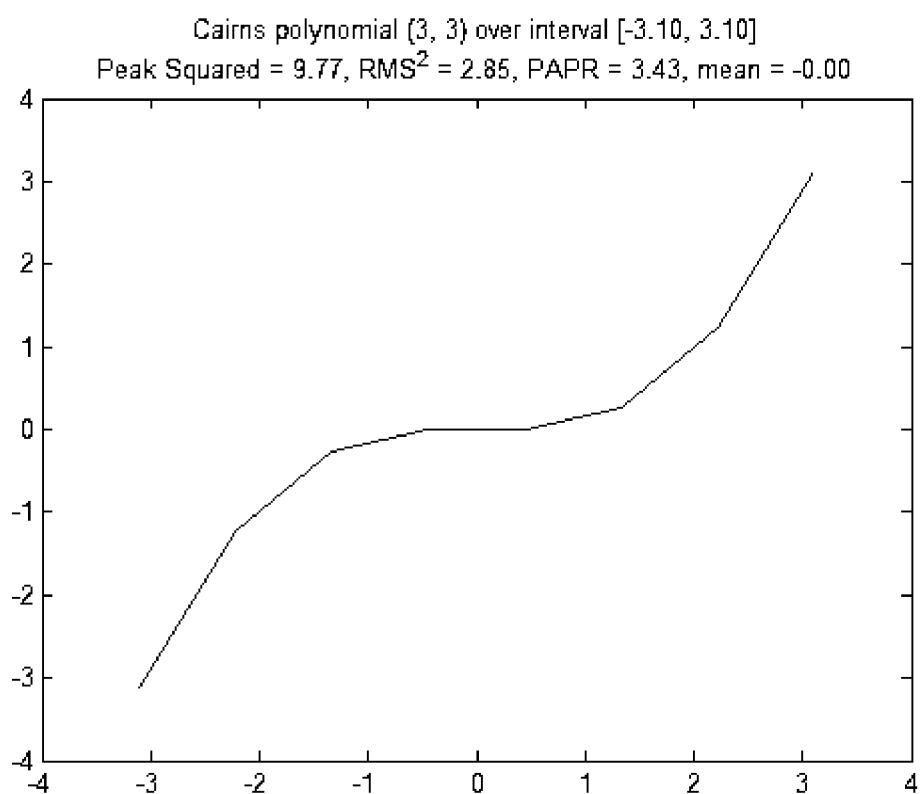
FIG. 8 may show an exemplary plot of a Cairns series function.

The Cairns series polynomials through m=3 are plotted in FIGS. 1-8 for the interval −3.1≤t≤3.1. For example, FIG. 1 shows an exemplary plot of a Cairns function for m=0 and n=0. FIGS. 3-8 demonstrate the observation discussed above; for example, FIG. 3, showing the exemplary plot of a Cairns function for m=2 and n=0, is symmetric about t=0, while FIG. 4, showing the exemplary plot of a Cairns function for m=2 and n=1, is anti-symmetric about t=0.

In some exemplary embodiments, the polynomials may be truncated at a sufficiently small value so as not to adversely affect accuracy significantly. For example, according to the exemplary embodiments shown in FIGS. 1-8, the polynomials may be truncated to $7^{th}$ degree polynomials, for which they provide a spanning set, consistent with the above discussion. In some exemplary embodiments, the polynomials may be constructed and plotted with eight points, uninterpolated, for consistency with SPDM techniques. According to an exemplary embodiment, SPDM may not smooth through interpolation until the transmission polynomial is formed by convolving a sum of Cairns functions with a reference polynomial.

The SPDM Instantiations

According to some exemplary embodiments, SPDM may be built on the idea of amplitude modulation of basis polynomials, which may then be transmitted using ISA to limit bandwidth usage.

According to an exemplary embodiment, SPDM may be implemented by amplitude modulating a set of basis polynomials which are orthogonal in the time domain, such as the Chebyshev polynomials of the first kind, to produce a transmission polynomial. In an embodiment, a sequence of amplitude values generated by the transmission polynomial may be transmitted using ISA. The receiver may then be configured to detect the transmission polynomial using, for example, a standard minimum Euclidean distance technique. In an embodiment, the basis polynomial amplitudes may then be determined by table lookup.

In another exemplary embodiment, SPDM may be implemented such that it makes use of another method of composing and decomposing the basis polynomials, for example orthogonality in the polynomial coefficient space, using Cairns polynomials. This and other embodiments may be described further on.

According to an exemplary embodiment, the SPDM algorithm may function as follows. In an embodiment, each sub-channel may correspond to a Cairns function selected from 0≤m≤M, where $2^M$ is the number of sub-channels. All sub-channels may be parameterized for the same "evaluation interval" symmetric around t=0. All sub-channels may be normalized to have the same RMS power budget over the evaluation interval. Synchronization and power normalization may be achieved between the transmitter and receiver, using techniques described in a later section. Information may be loaded onto each sub-channel through amplitude modulation of the Cairns functions based on input bit sequences. For example, according to one exemplary embodiment, if a given sub-channel conveys two bits per transmission, it may have four possible amplitude values, corresponding to the bit sequences 00, 01, 10, and 11 (with appropriate Gray coding).

According to an exemplary embodiment, since amplitude modulation of the Cairns functions provides a spanning set for all polynomials of a given degree, phase may not be considered, as no loss of generality may occur from not considering other possible modulations such as phase.

In an exemplary embodiment, the sub-channels may be summed according to their amplitude modulation to produce a composite "message polynomial". Optionally, according to some exemplary embodiments, the message polynomial may be multiplied (convolved) with a "reference polynomial". The reference polynomial may be introduced in order to, for example, provide a known pattern to look for, or in order to better characterize a channel. In another embodiment, the reference polynomial may be introduced in order to, for example, provide a smooth join between TTI's; alternatively, or additionally, this may be accomplished through ISA interpolation. In some embodiments, a reference polynomial designed to provide smoothing and to reduce the amplitude to zero at the TTI boundaries may be any Cairns function with $m \geq 2$, $n=0$ in the region around $t=0$, if scaled and translated to have amplitude values in the range zero to one. According to some embodiments, the evaluation region may thus be picked to be symmetric around $t=0$.

According to an exemplary embodiment, the simplest reference polynomial with reasonable properties may be $\psi_{3,0}(t)$, truncated to fourth degree: $1-t^4/4!$ In some embodiments, this may thus be used as the default reference polynomial for SPDM. In other embodiments, larger values of m in $\psi_{m,0}(t)$ may be used, which may provide better roll-off properties, but require higher-degree polynomials. In an exemplary embodiment, higher degree reference polynomials may effectively reduce the degrees of freedom available to the message polynomial, and therefore reduce traffic (user data throughput). In some exemplary embodiments, the reference polynomial may be known ahead of time to both the transmitter and receiver.

The product of the message polynomial with the reference polynomial is termed the "transmission polynomial". (If there is no reference polynomial, the message polynomial is also termed the transmission polynomial.) In an embodiment, the degree of the transmission polynomial is the sum of the degrees of the message and reference polynomials. The transmission polynomial may then be converted into a sum of sinusoidals with continuously-varying amplitude using ISA.

In an embodiment, a sequence of amplitude values over the evaluation interval may be generated from the ISA representation of the transmission polynomial and may be transmitted, which may in an exemplary embodiment constitute the data for one TTI. In some embodiments, the number of points generated may be at least one greater than the degree of the transmission polynomial. However, values in excess of this may also be used; the amplitude values may be upsampled beyond this point, for example in order to ensure smooth interpolation, or so that the DMX has more points to work with as explained below. According to an exemplary embodiment, which may for ease of reference be used in subsequent examples, the transmission polynomial may be upsampled by a factor of eight.

According to an exemplary embodiment, in the receiver, the DMX may fit a polynomial to the received data, regenerating the transmission polynomial. Since the default reference polynomial pushes amplitude values at the TTI boundary to zero (which are therefore noise-prone), according to an exemplary embodiment, the receiver may be aided by upsampling in the transmitter, which may facilitate regeneration of the transmission polynomial from high-amplitude points in the middle of the transmission.

According to an exemplary embodiment, the DMX may deconvolve the reference polynomial from the transmission polynomial to recover the transmitted message polynomial.

According to an exemplary embodiment, the sub-channel amplitudes may then be re-constructed by projecting the message polynomial onto Cairns space.

According to an exemplary embodiment, the sub-channels may then be converted back into bits by mapping the amplitude values for each sub-channel into bit sequences.

Figure 9:
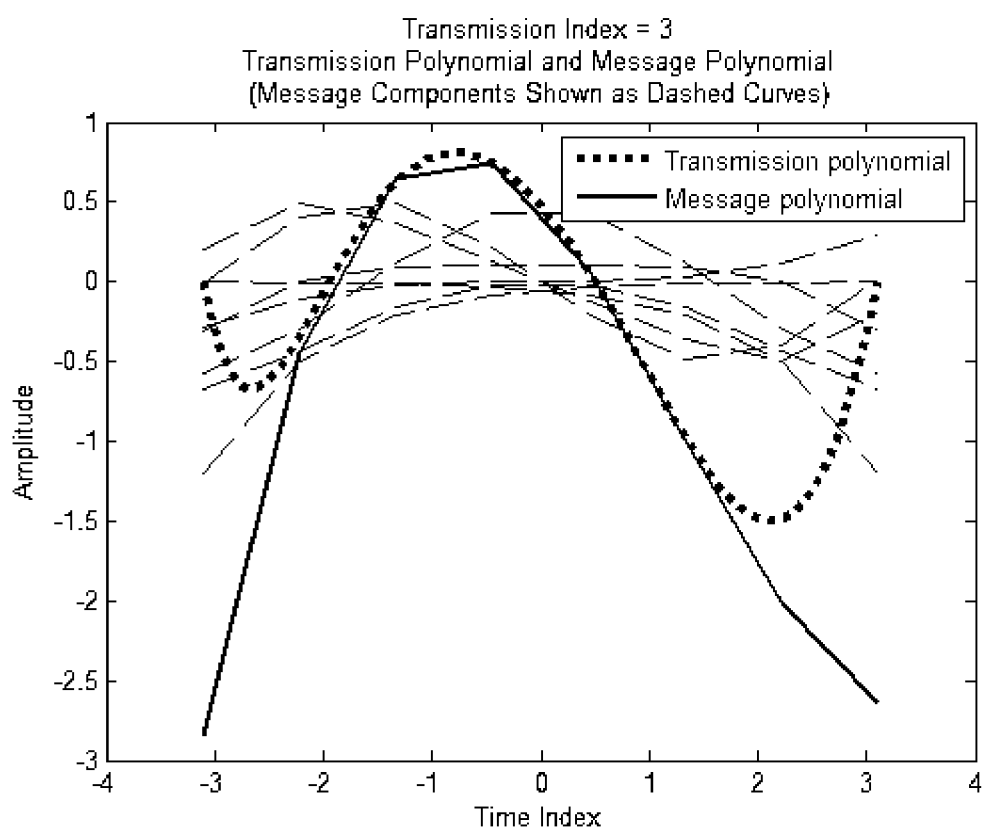
FIG. 9 may show an exemplary plot of a transmission polynomial.
Figure 10:
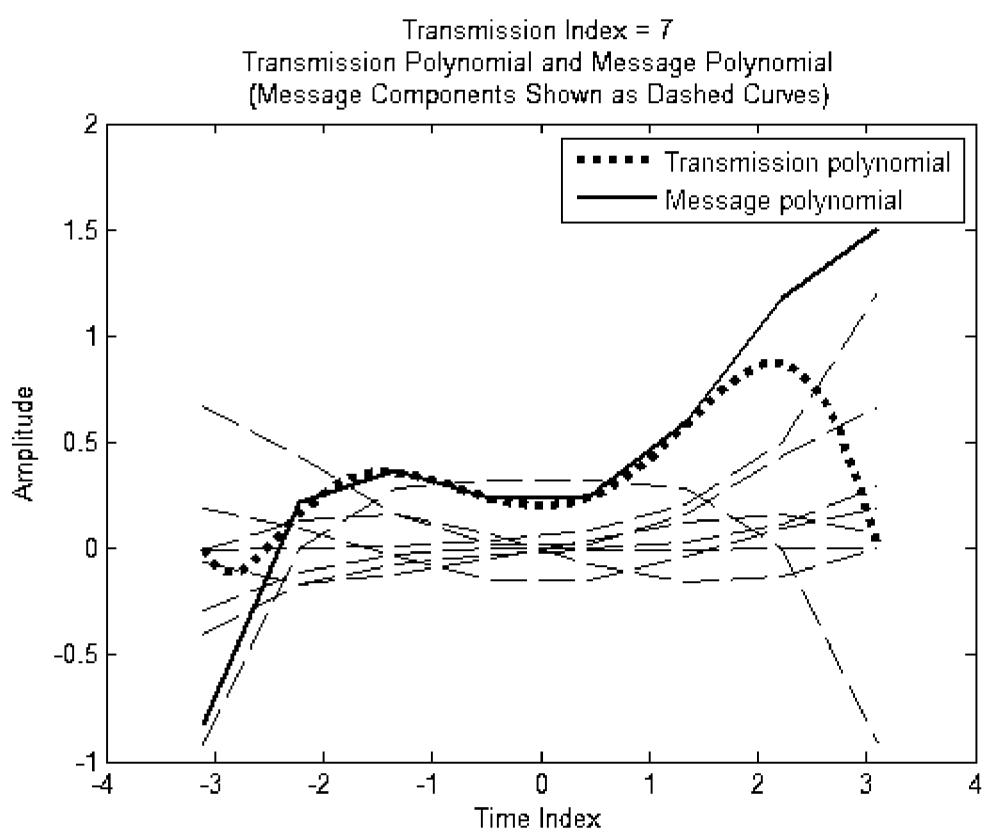
FIG. 10 may show an exemplary plot of a transmission polynomial.

FIGS. 9 and 10 may show two sample transmissions. In FIGS. 9 and 10, amplitudes generated by the transmission polynomial are shown as a dotted (rather than dashed or solid) line; this may correspond to what may be sent over the channel. According to the embodiments shown in FIGS. 9 and 10, every TTI may start and end at amplitude zero due to the effect of the reference polynomial.

The message polynomial (which may be obtained in the DMX by deconvolving the reference polynomial from the transmission polynomial) is shown in black. The dashed black lines show the eight Cairns functions (selected from $m \leq 3$) which may, when summed, produce the message polynomial. They may be obtained from the message polynomial by projection onto Cairns space, and their respective amplitudes may determine the sub-channel messages.

According to the embodiments depicted in FIGS. 9 and 10, the transmission and message polynomials may essentially overlap in the center of the TTI, where the reference polynomial has high amplitude. At the edges of the TTI, in an exemplary embodiment, the reference polynomial may force the transmission polynomial to zero amplitude, which may cause it to diverge from the message polynomial.

Reference Polynomials

According to an exemplary embodiment, the purpose of the reference polynomial may be as described above.

A feature of reference polynomials may be that deconvolution of the reference polynomial from the correct transmission polynomial in the receiver allows the original message polynomial to be reconstructed unambiguously.

Figure 11:
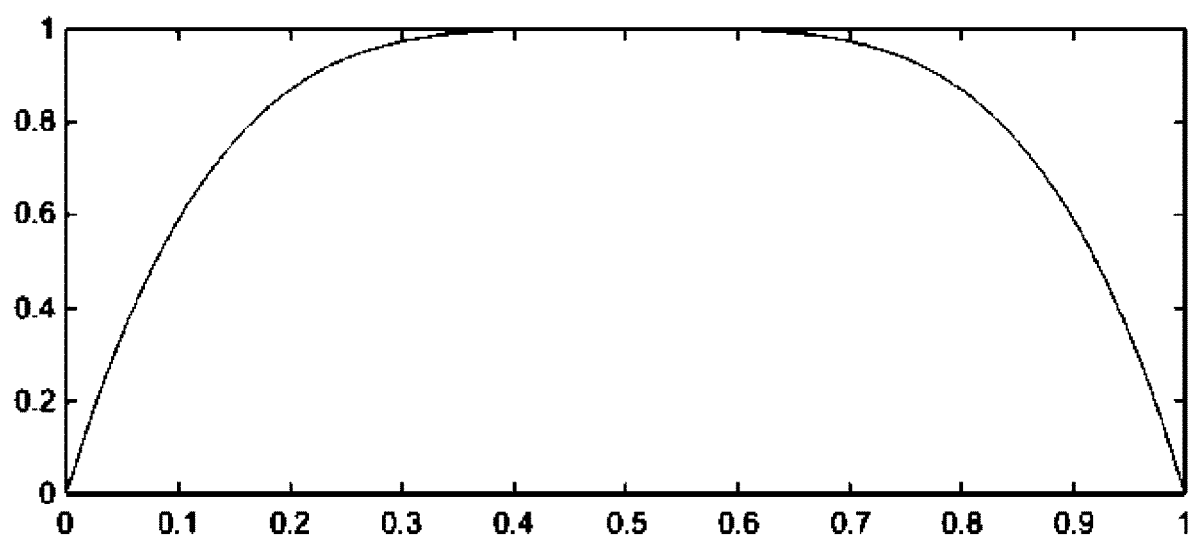
FIG. 11 may show an exemplary plot of a reference polynomial.

As indicated above, a low-degree reference polynomial with useful properties may be $\psi_{3,0}(t)$ truncated to fourth degree. This reference polynomial is scaled and vertically translated so that over the evaluation interval it has amplitudes in the range between 0 and 1. Such a polynomial is depicted in FIG. 11.

According to an exemplary embodiment, the degree of the reference polynomial may be kept as low as possible. This may be, for example, because the number of independent points a TTI must be capable of representing is equal to the degree of the transmission polynomial plus one, which is equal to the sum of the degrees of the message polynomial and the reference polynomial plus one. For example, in an exemplary embodiment where the number of independent points the channel is capable of transmitting in a TTI is fixed, every degree in the reference polynomial may effectively "steal" a degree from the message polynomial, and therefore may reduce traffic. Essentially, reference polynomial degree in SPDM may impose a cost similar to guard bands in traditional signal modulation techniques.

Since the reference polynomial imposes a cost associated with its degree, in some exemplary embodiments, the degree of the message polynomial may be increased or maximized in order to reduce the relative burden of the reference polynomial, and therefore increase traffic. For instance, according to some exemplary embodiments, the M=3 examples used in this document may be moved to M=4 or higher.

However, in other exemplary embodiments, the degree of the message polynomial may not be increased or maximized, for one of several reasons. For example, in an exemplary embodiment, increasing the value of M may increase the computational burden on the system, as higher values of M may require the SPDM MUX and DMX to generate and analyze higher-degree polynomials. Increasing the value of M may also require that the complexity of the system be increased. Since SPDM may use Taylor polynomials, terms may have coefficients inversely proportional to the factorial of each term's degree. High-degree polynomials therefore may force the SPDM implementation to handle a very wide range of numbers with precision, increasing complexity.

Synchronization and Power Control

According to an exemplary embodiment, for the receiver to correctly interpret the information the transmitter provides, the two ends of the communication channel may have to agree on when a message starts. The process for ensuring that this occurs is call "synchronization".

Further, according to such an exemplary embodiment, the two ends of the communication channel may have to agree on the power of the transmitted message so that amplitude information is interpreted correctly. This may be referred to as "power control".

This section describes how synchronization and power control may be jointly performed by SPDM.

SPDM may support at least three methods for synchronization, the choice of which may depend on how much of the channel power budget is diverted from traffic to synchronization in a particular TTI. According to an exemplary embodiment, the amount of power diverted from traffic will be minimized, since the purpose of the communication channel is to convey user information and since diverting power from traffic conflicts with that goal.

According to an exemplary embodiment, very accurate synchronization may be possible with no reduction in traffic for channels with relatively low impairment.

In some exemplary embodiments, SPDM synchronization may be implemented subject to one or more conditions. The below subsections describe SPDM synchronization assuming that one of the following three conditions holds:

Full Power Synchronization. The full channel power is made available for synchronization in a particular TTI.

Limited Power Synchronization. Only the channel power associated with the rising and falling exponential sub-channels is made available for synchronization in a particular TTI.

No Power Synchronization. No channel power is made available for synchronization.

Full Power Synchronization

According to an exemplary embodiment, when full power synchronization is used, SPDM may transmit for one TTI a message polynomial whose sub-channels include a rising and falling exponential with equal peak amplitude together absorbing all available channel power, with all other sub-channels set to amplitude zero. (According to an exemplary embodiment, the transmission interval may be parameterized to be symmetric around t=0, which may result in the peak amplitude for the rising and falling exponentials being equal if the two exponentials have the same projection coefficient.) As shown below, this may provide the receiver with a very strong signature for correct synchronization. (The exponentials may, however, be bandlimited by ISA prior to transmission.)

According to an exemplary embodiment, the SPDM can use a brute-force synchronization strategy in which it tries all possible synchronization phases (time offsets) until it identifies the correct synchronization signature.

Figure 12:
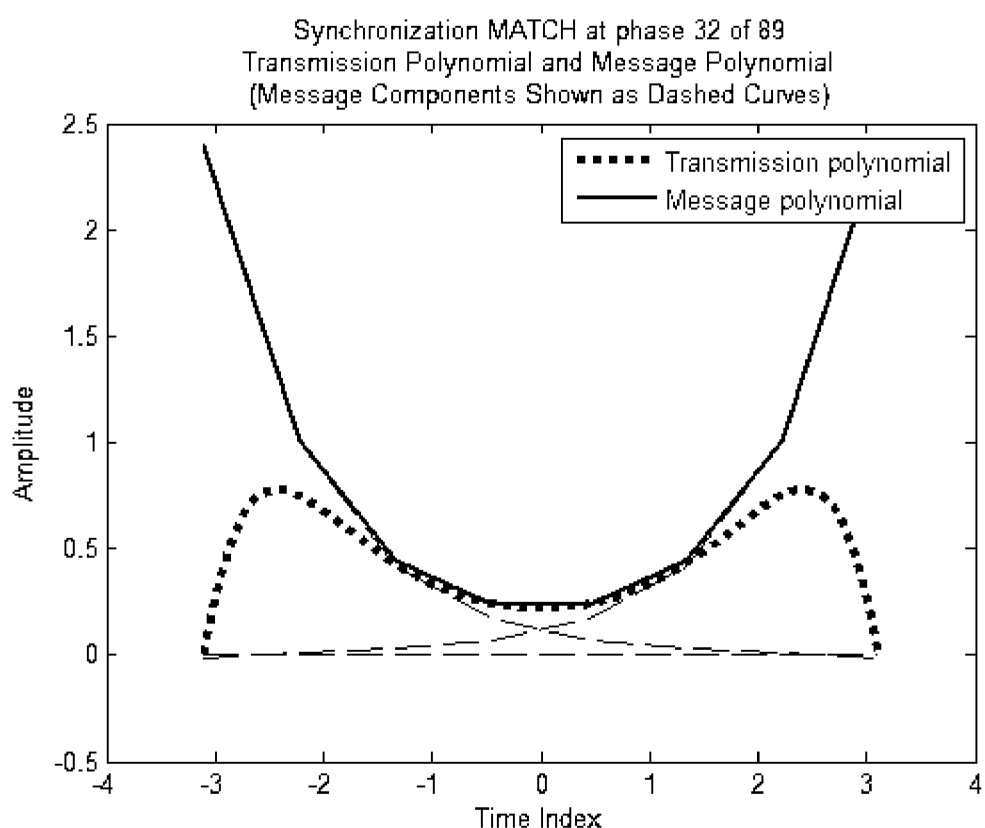
FIG. 12 may show an exemplary plot of a synchronization phase match.
Figure 13:
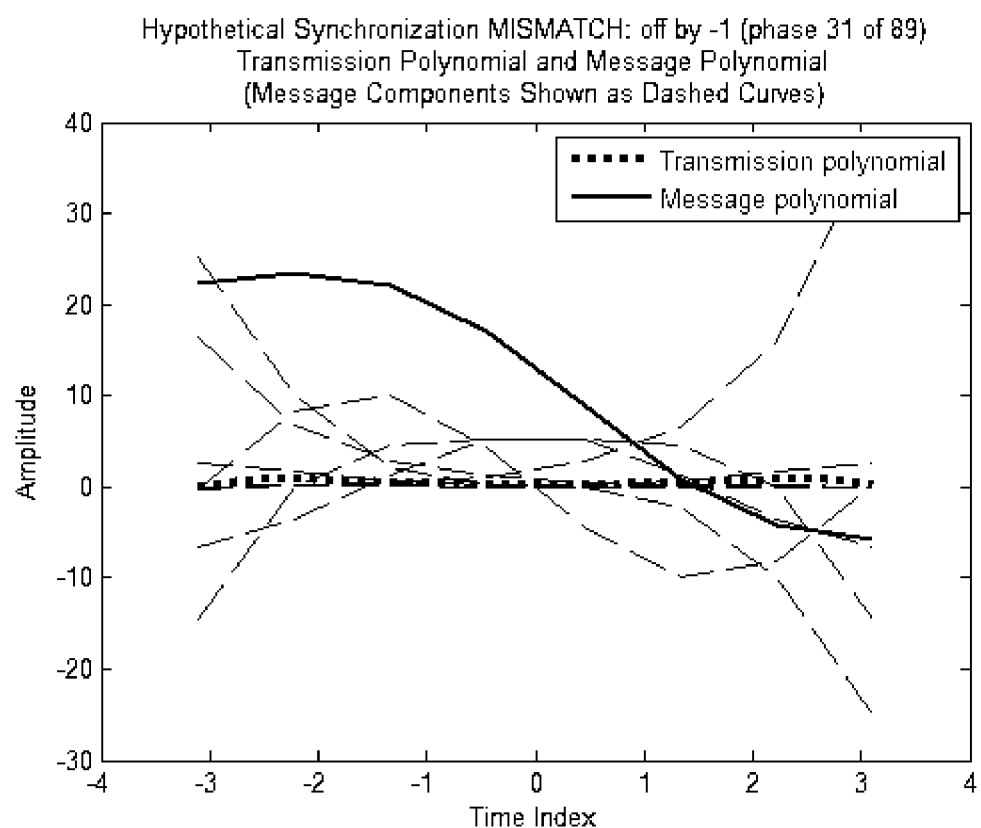
FIG. 13 may show an exemplary plot of a synchronization phase mismatch.
Figure 14:
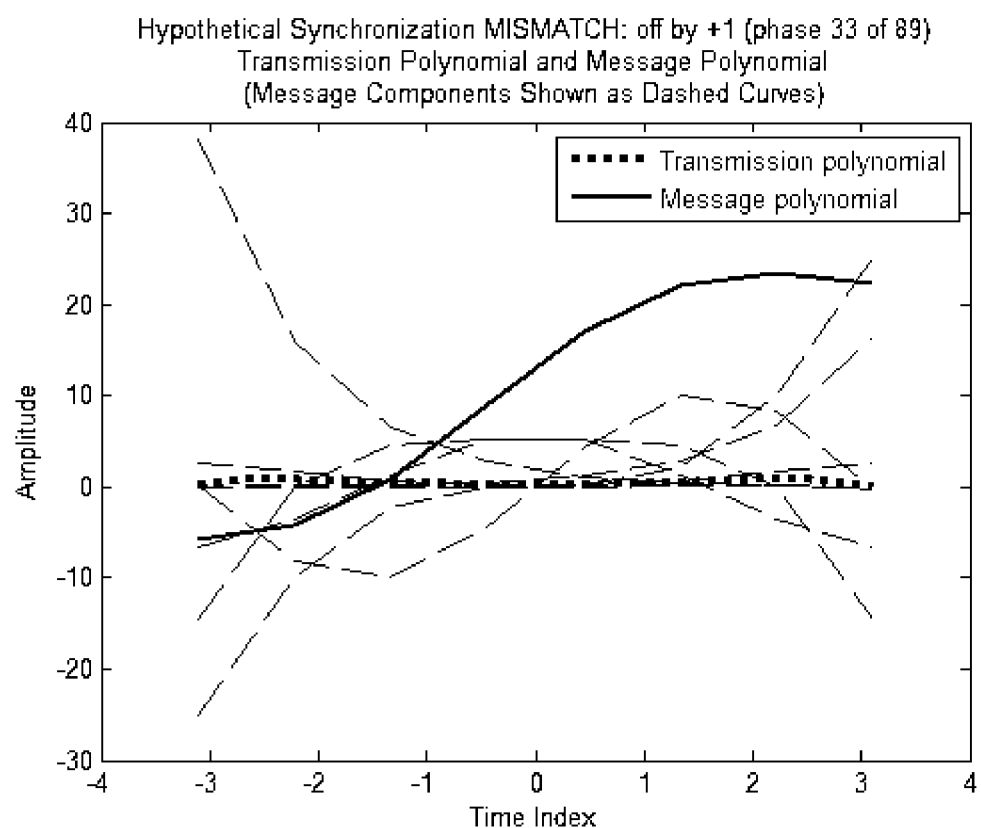
FIG. 14 may show an exemplary plot of a synchronization phase mismatch.

On a channel with no impairments, FIG. 12 shows an exemplary embodiment of what the receiver may observe when it has correct synchronization. Also shown, in FIGS. 13 and 14, are exemplary embodiments of what the receiver may see if it is off on the phase by only 1 part in 89; specifically, FIG. 13 depicts a phase mismatch of −1/89, while FIG. 14 depicts a phase mismatch of +1/89. Put differently, the "mismatch" figures may show what the receiver would have to mistake for the correct phase in order to make a phase error of 1 part in 89. (In the exemplary embodiments depicted in FIGS. 12 through 14, the "1 part in 89" phase error may be a reflection of the number of interpolation points chosen for the transmission polynomial, and hence the number of amplitude values in the TTI. In some cases, synchronization could be achieved more accurately than this, depending on channel conditions. In some exemplary embodiments, a different number of interpolation points may be chosen, if desired, which may result in differences in synchronization accuracy.)

Notably, the exemplary embodiments of "mismatch" message polynomials depicted in FIGS. 13 and 14 are quite different in shape from the correctly synchronized polynomial, despite differing in phase by only 1 part in 89. Notice also that the vertical axes differ by more than a factor of ten.

The synchronization signature is so strong because a small displacement in phase may cause either the rising or falling exponent (the two components in the synchronization message polynomial) to dominate over the other, breaking the balance between them that is the signature of correct synchronization. In physics terms, this balance between the rising and falling exponentials may be understood as a deliberately created unstable equilibrium, similar to balancing a pencil on its tip, which may be destroyed by even very small phase errors.

At the synchronization phase, the common received amplitude of the rising and falling exponentials can be used for power normalization, by comparing their observed amplitudes to a reference value.

According to an exemplary embodiment, the SPDM receiver may be configured to identify the correct synchronization phase by examining possible phase shifts of the received amplitude data, and finding the message polynomial and message polynomial sub-channel coefficients implied by that phase. In an embodiment, the SPDM receiver may select the phase that produces the smallest Euclidean distance between the correct sub-channel coefficients and the observed sub-channel coefficients as the correct phase for synchronization. For the above example, the Euclidean distances of all possible synchronization phases are plotted in FIG. 15.

Figure 15:
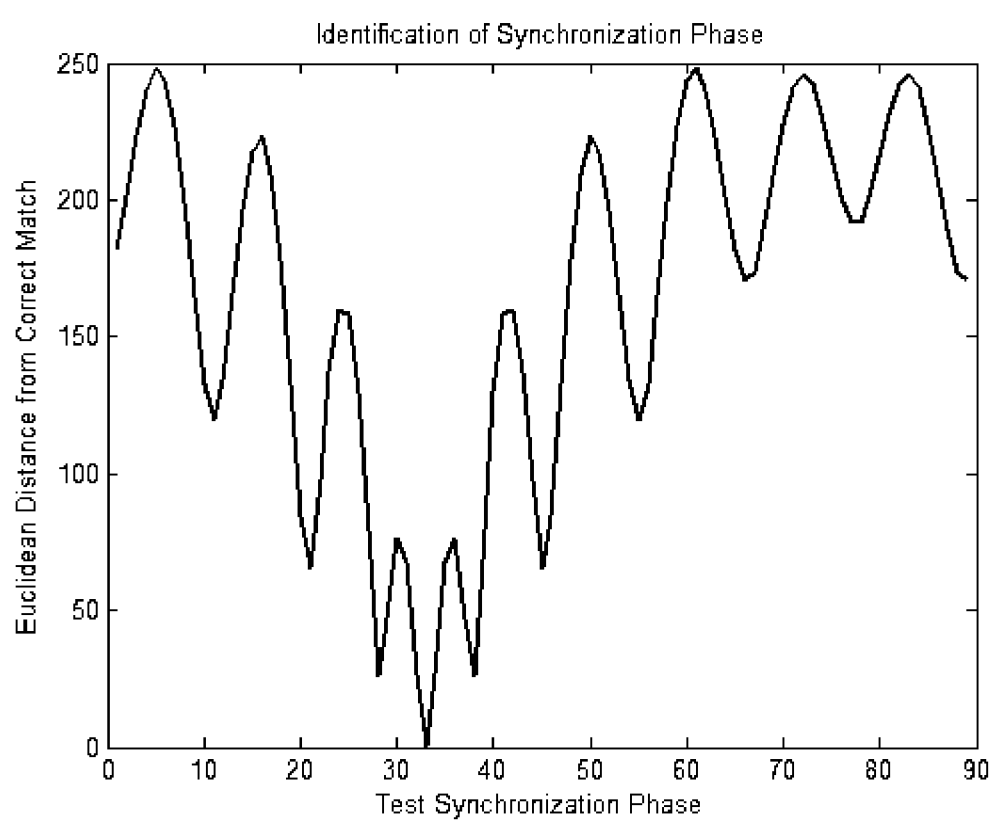
FIG. 15 may show an exemplary plot of the Euclidean distances of possible synchronization phases.

According to the embodiment depicted in FIG. 15, the "correct" synchronization phase of 32/89 in this case has a significantly lower Euclidean distance from the correct match than any other potential synchronization phases. Furthermore, the Euclidean distance error measures for adjacent phases have combined slopes on both sides that point to the correct synchronization phase.

Limited Power Synchronization

The "full power" synchronization method depicted above may produce a very strong signature for synchronization in one TTI. However, it may also require using all communication power in that TTI for synchronization, which may cut traffic to zero. According to an exemplary embodiment, however, a device may be synchronized accurately without shutting down user communication for one TTI through the use of limited power synchronization.

According to an exemplary embodiment, limited power synchronization may be achieved by taking advantage of the fact that the rising and falling exponents are orthogonal to all other Cairns functions in the message polynomial coefficient space.

According to such an embodiment, the limited power synchronization method may operate as follows. First, a power budget may be assigned to the rising and falling exponentials; for instance, in one exemplary embodiment, each of the rising and the falling exponentials could be given the same RMS power budget as all other Cairns function message polynomial sub-channels. Second, on a synchronization TTI, the rising and falling exponentials may both be transmitted with their maximum allowable power. In an exemplary embodiment, all other sub-channels can be independently amplitude modulated as usual to carry traffic. Third, in the receiver, synchronization may proceed as with the "full power" method described above, with the distinction that only the rising and falling exponent coefficients may be matched. In an embodiment, all of the other sub-channels may be handled using the "no power" approach described below. In an exemplary embodiment, synchronization may use a "full power" approach using the rising and falling exponent coefficients, a "no power" approach using other sub-channels, or a combination of the two; for example, synchronization may determine the best combination of the "full power" approaches performed on some sub-channels and the "no power" approaches performed on other sub-channels, such as a transmission polynomial that produces the lowest total deviation from both sets of sub-channels.

For example, according to an exemplary embodiment, the rising and falling exponential coefficients may be assumed to be set to a specific fraction of the available signal power, such as $1/8$ of the signal power each if there are 8 basis polynomials or equivalently 8 sub-channels. The remaining sub-channels may be assumed to have coefficients of zero. If there are 8 sub-channels, this means that user data transmission may be reduced by $2/8=1/4$ by synchronization.

According to an exemplary embodiment, "limited power" synchronization may be less robust than "full power" synchronization. This may be because the power given to the rising and falling exponentials is smaller, and because it is not possible to assume that non-exponential amplitudes should be zero as part of the match signature. However, "limited power" synchronization may still be adequately robust for many implementations.

Figure 16:
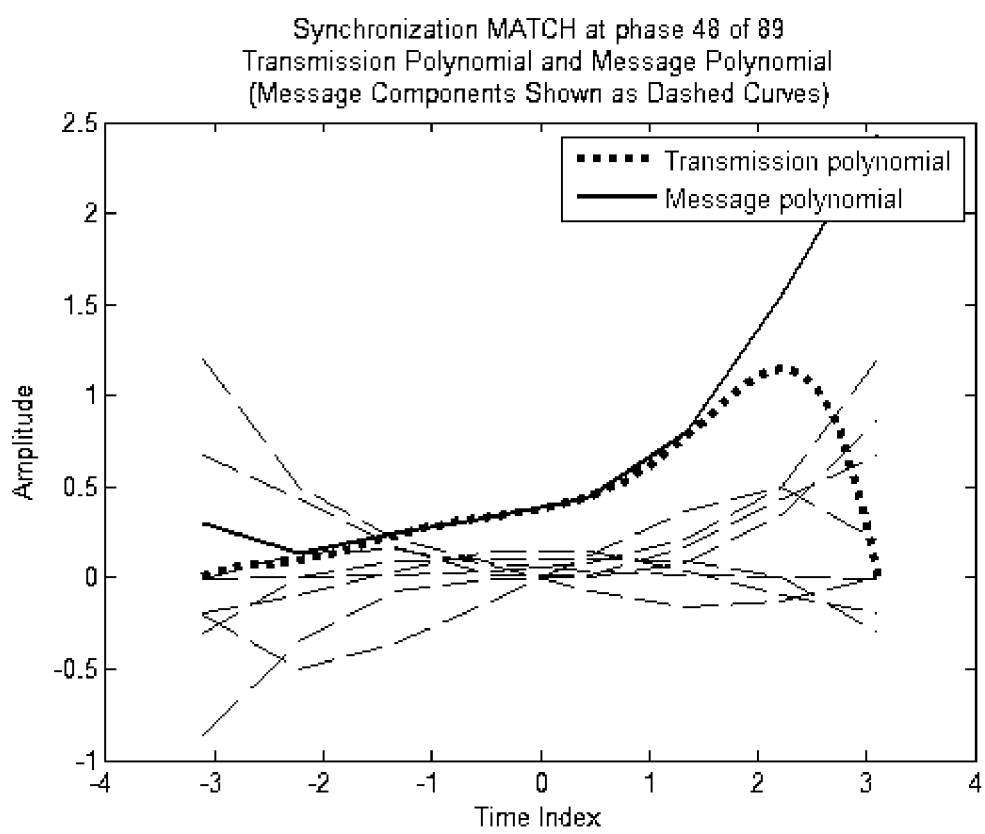
FIG. 16 may show an exemplary plot of a synchronization phase match.
Figure 17:
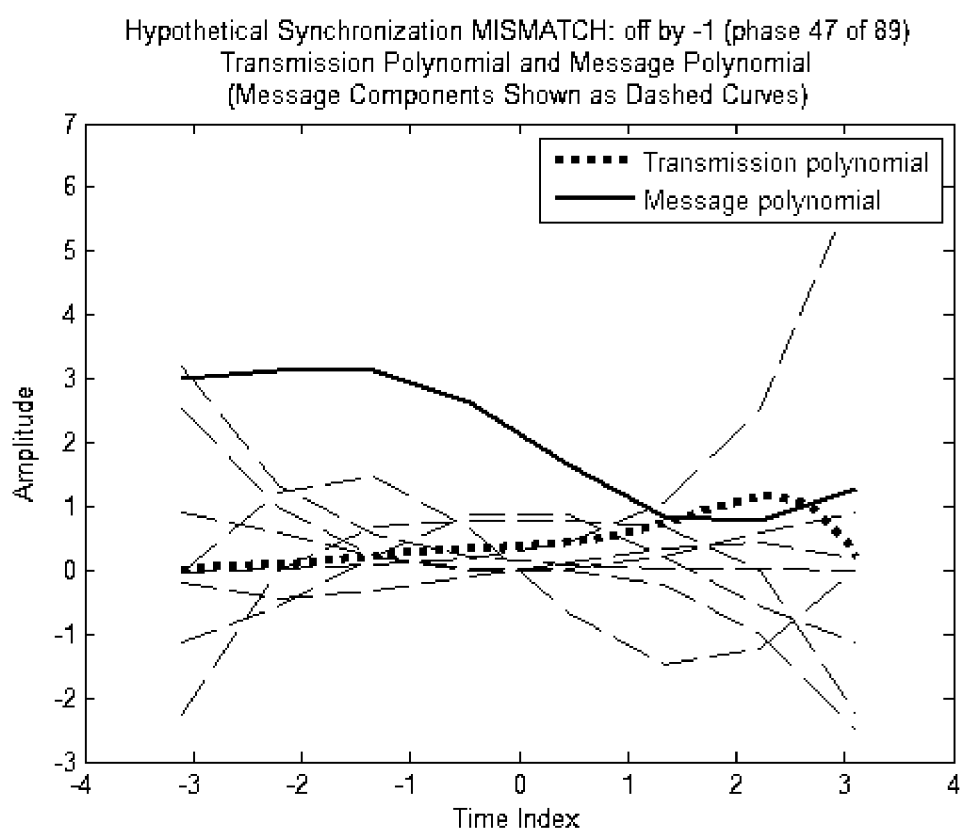
FIG. 17 may show an exemplary plot of a synchronization phase mismatch.
Figure 18:
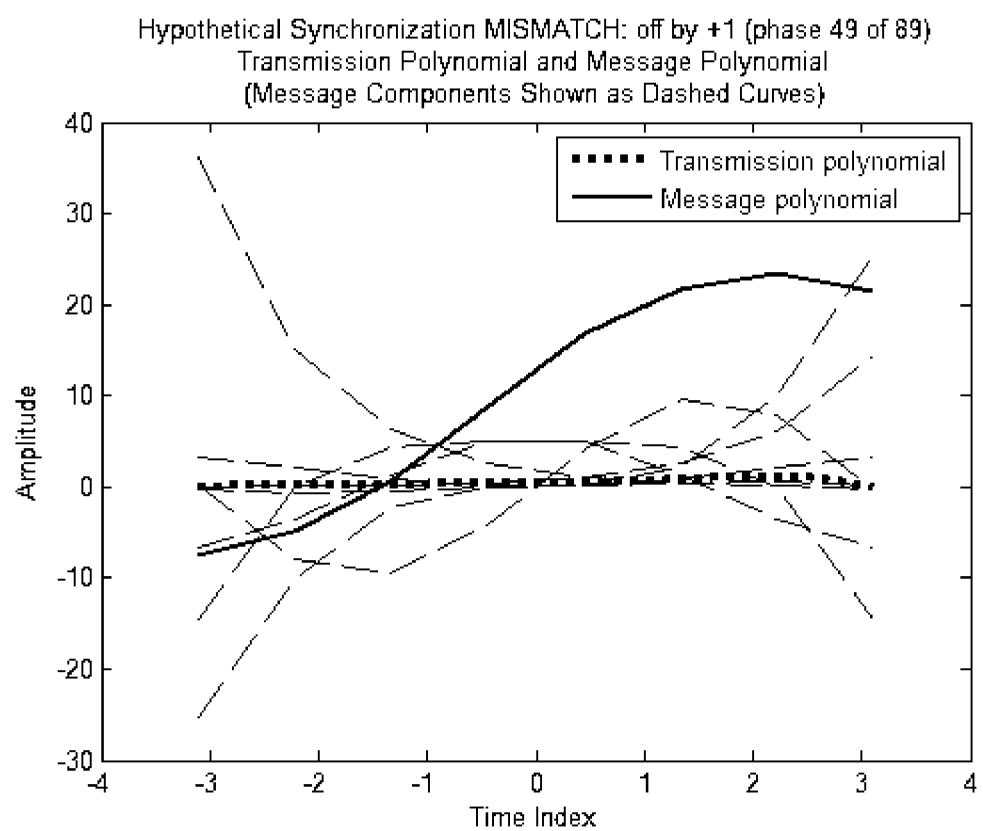
FIG. 18 may show an exemplary plot of a synchronization phase mismatch.
Figure 19:
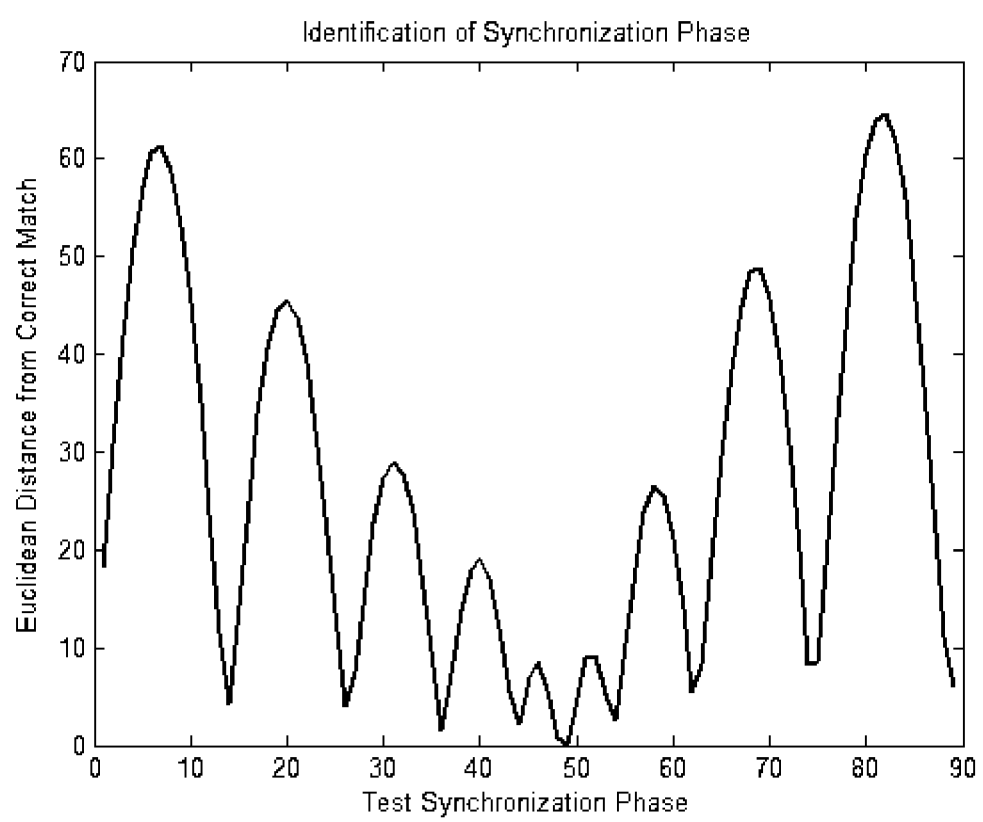
FIG. 19 may show an exemplary plot of the Euclidean distances of possible synchronization phases.

FIGS. 16-19 may mirror FIGS. 12-15, discussed above; however, FIGS. 16-19 may show the altered performance of a system that is using "limited power" synchronization rather than "full power" synchronization. On a channel with no impairments, FIG. 16, like FIG. 12, shows what the receiver may observe when it has correct synchronization. Also shown, in FIGS. 17 and 18, are exemplary embodiments of what the receiver may see if it is off on the phase by only 1 part in 89; specifically, FIG. 17 depicts a phase mismatch of −1/89, while FIG. 18 depicts a phase mismatch of +1/89. Put differently, the "mismatch" figures may show what the receiver would have to mistake for the correct phase in order to make a phase error of 1 part in 89. FIG. 19 may, like FIG. 15, show the Euclidean distances of all possible synchronization phases.

No Power Synchronization

According to another exemplary embodiment, it may be possible under some circumstances to synchronize SPDM without dedicating any power to synchronization, thus allowing full traffic to take place during synchronization. According to such an embodiment, this may be done by taking advantage of the fact that the SPDM message polynomial space is huge (it spans all polynomials up to degree $2^M-1$), but that most of the polynomials in the SPDM message polynomial space would not be able to have been generated by the SPDM transmitter, for example due to power or PAPR limitations. If the synchronization phase is incorrect, the received message polynomial is highly likely to contain component amplitude values that the transmitter could not have generated.

As such, according to such an embodiment, the receiver can take advantage of this fact to synchronize on the phase where the message polynomial component amplitudes are closest to all being zero (the average value of component amplitudes for allowable random message polynomials).

However, two potential concerns exist regarding "no power" synchronization. First, according to some exemplary embodiments, "no power" synchronization may fail to consistently transmit data even with no channel impairments, because a compliant message polynomial could be generated essentially by chance at an incorrect synchronization phase. In some embodiments, the receiver may take action to mitigate this; for example, in an exemplary embodiment, the receiver may choose or may be able to choose from several potential phases based on those phases having message polynomial component amplitudes that are all closest to zero. In an exemplary embodiment, the receiver may then parse the content of each of these potential messages and select the one that is most likely to have been sent; for example, if one such potential message contains a working image file or a number of words recognized in the receiver's dictionary, and all of the other potential messages would be meaningless noise, the receiver could identify the message containing the working file or the recognized words as being the most likely one to have been sent to the receiver and thus the proper message to receive. Alternatively, each of the potentially valid messages may be presented, if desired.

According to some embodiments, "no power" synchronization also may not be used to normalize power by the method used in "full power" and "limited power" synchronization, because "no power" synchronization does not provide a known reference amplitude value. However, in an exemplary embodiment, power normalization may still be performed or may be performable; for example, in an exemplary embodiment, power normalization may be performed by examining the maximum amplitudes observed in the sub-channels, and comparing them to the reference maximum amplitude values for the sub-channels.

Figure 23:
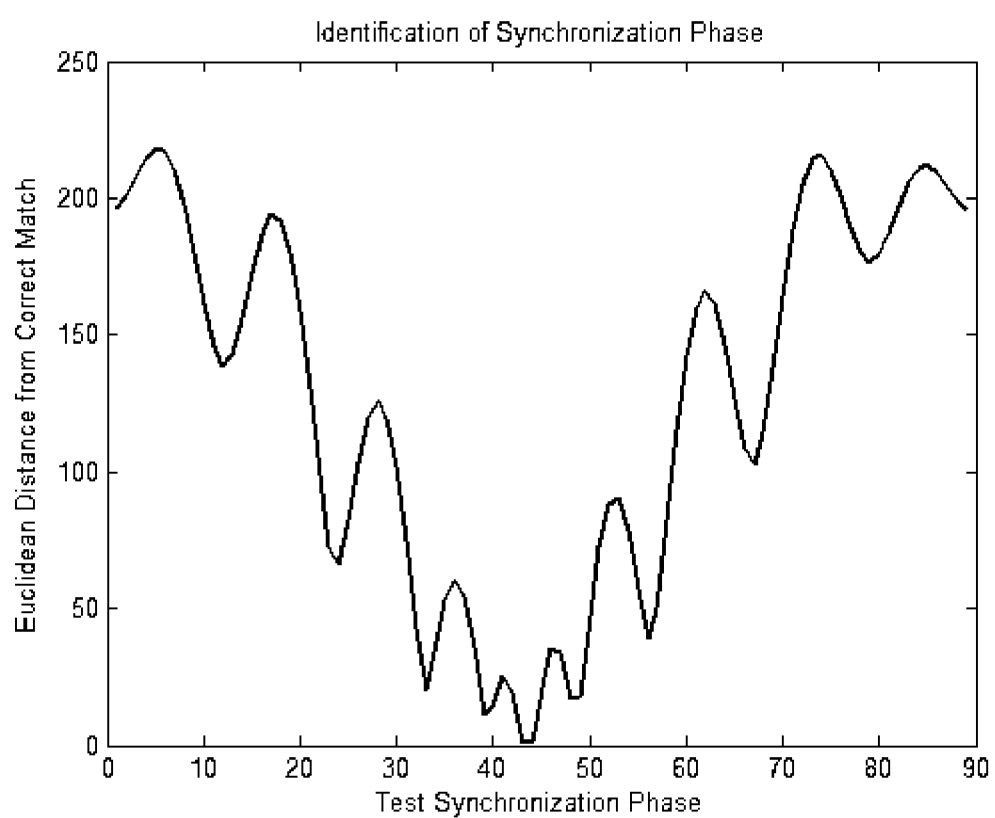
FIG. 23 may show an exemplary plot of the Euclidean distances of possible synchronization phases.

However, according to some embodiments, "no power" synchronization may still be used effectively, thus allowing full traffic during synchronization. FIG. 23 shows a plot of No Power Synchronization Distance by Phase, in which the correct phase is 43/89; this may be compared to a similar plot for "full power" synchronization, shown in FIG. 15 (correct phase 32/89). FIG. 23 indicates that the synchronization signature for "no power" synchronization may, in some embodiments, be almost as clear as for the "full power" synchronization method discussed earlier, which may make "no power" synchronization practical for use.

According to some embodiments, a system making use of "no power" synchronization may also be able to take advantage of the fact that, when the synchronization phase is wrong, the message polynomial will generally not be close to the transmission polynomial in the center of the TTI if the default reference polynomial is used, as may be the case for correct synchronization phase alignment. According to those embodiments, the message polynomial will generally be close to the transmission polynomial in the center of the TTI in the event that the correct synchronization phase alignment is identified.

Figure 20:
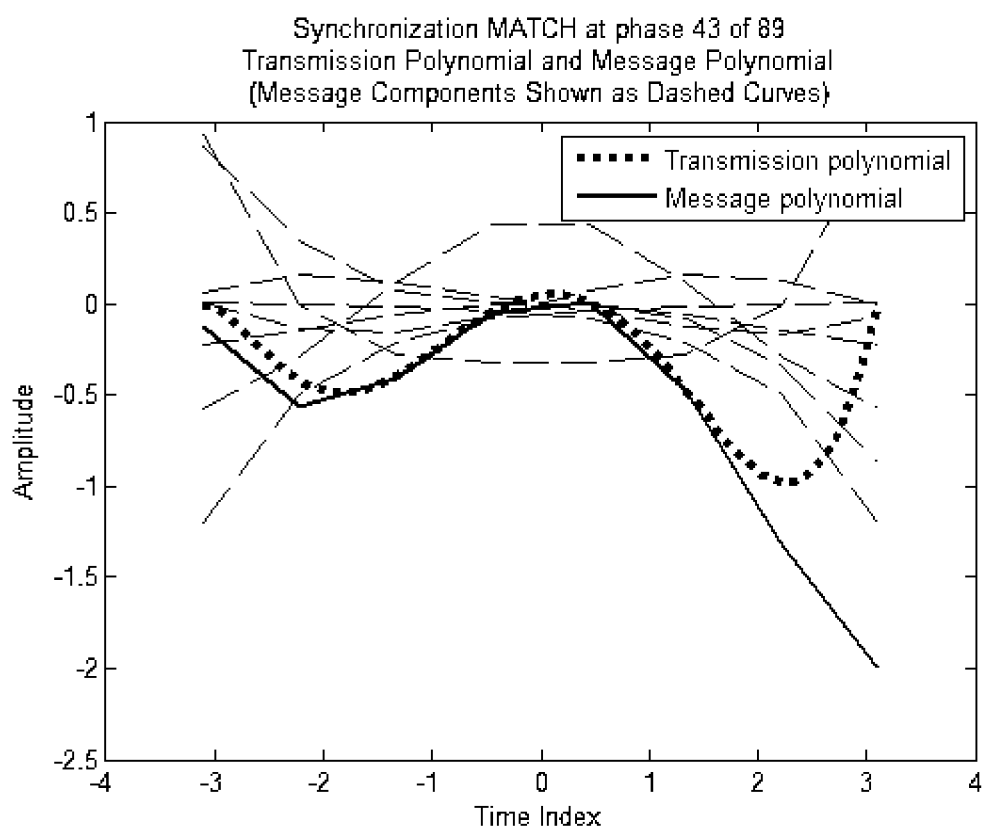
FIG. 20 may show an exemplary plot of a synchronization phase match.
Figure 21:
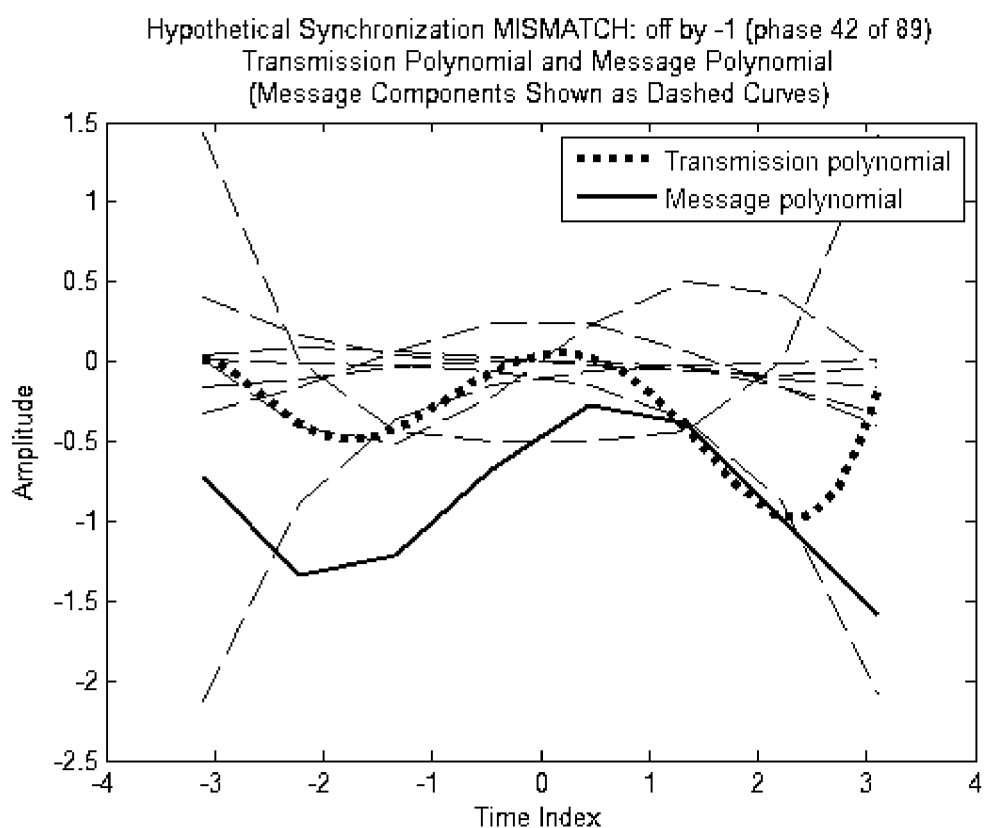
FIG. 21 may show an exemplary plot of a synchronization phase mismatch.
Figure 22:
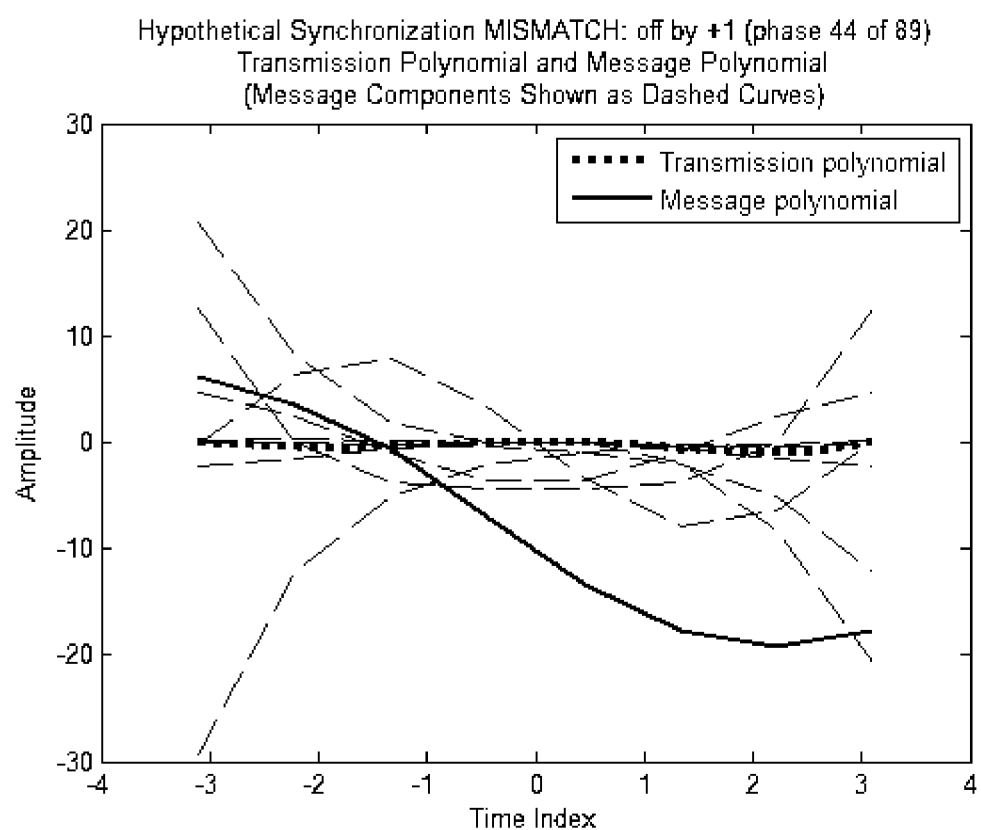
FIG. 22 may show an exemplary plot of a synchronization phase mismatch.

Turning now to exemplary FIGS. 20-23, FIGS. 20-23 may mirror FIGS. 12-15, discussed above; however, FIGS. 20-23 may show the altered performance of an exemplary embodiment of a system that is using "no power" synchronization rather than "full power" synchronization. On a channel with no impairments, FIG. 20, like FIG. 12, shows an exemplary embodiment of what the receiver may observe when it has correct synchronization. Also shown, in FIGS. 21 and 22, are exemplary embodiments of what the receiver may see if it is off on the phase by only 1 part in 89. Specifically, FIG. 21 depicts an exemplary embodiment of a received signal having a phase mismatch of −1/89, while FIG. 22 depicts an exemplary embodiment of a received signal having a phase mismatch of +1/89. Put differently, the "mismatch" figures may show what the receiver would have to mistake for the correct phase in order to make a phase error of 1 part in 89. FIG. 23 may, like FIG. 15, show the Euclidean distances of all possible synchronization phases.

Projection Coefficient Rotation and Dimension Reduction

When using the Cairns polynomials as the basis polynomials, the set of projection coefficients can be thought of as forming a multi-dimensional vector space.

For instance, according to an exemplary embodiment wherein Cairns polynomials are used as the basis polynomials in an SPDM system, a SPDM may make use of the first 8 Cairns functions available through the m=3 level: $\psi_{0,0}(t)$, $\psi_{1,0}(t)$, $\psi_{2,0}(t)$, $\psi_{2,1}(t)$, $\psi_{3,0}(t)$, $\psi_{3,1}(t)$, $\psi_{3,2}(t)$, and $\psi_{3,3}(t)$. Any polynomial of degree 7 or lower may correspond uniquely to some set of 8 real-valued coefficients for these functions, which may be obtainable by projecting the polynomial onto Cairns space. The values of the 8 projection coefficients can be thought of as forming a vector in an 8-dimensional space. The $2^{M=3}$ Cairns basis vectors provide a set of orthonormal axes spanning this space. Such a configuration of projection coefficients may allow mathematical tools developed for dealing with vector spaces to be applied to the Cairns basis vectors.

For example, the idea of axial rotation may be applied to the vector space. A set of axes may be called a "reference frame". A reference frame can be rotated to make certain problems easier to analyze, for instance to align a symmetry in the data with the axes. It is also possible to reduce the dimensionality of a vector space by removing one or more axes, either in the original or in the rotated reference frame. This prevents vectors from being formed that are wholly or partially aligned with the removed axis or axes. In some exemplary embodiments, this technique may be applied to rejecting coherent interference and to reducing PAPR.

Coherent Interference Rejection

As with message polynomials, according to an exemplary embodiment, coherent interference may be projected onto Cairns space for analysis. In some embodiments, to the extent that a clear pattern for the channel impairment appears, an SPDM system may be configured to adjust itself to improve performance.

To illustrate how this may be implemented, according to an exemplary embodiment, for an interfering signal, an SPDM system may fit polynomials to the interfering signal over each of a series of TTI's, and project each of the resulting series of polynomials onto Cairns space for m≤3. In an example, the interfering signal over the series of projections may be supposed to be largely characterized by a 1-dimensional pattern of variation in the projection coefficient space, though in some exemplary embodiments higher-dimensional cases can also be handled, if desired.

In this case, the interference can be viewed as occurring along a vector in the projection coefficient space. In an embodiment, the projection coefficient reference space may be rotated, as described in the previous section, so that the interference vector falls along one axis.

In an embodiment, a SPDM system can then remove the interference vector by dropping the dimensionality of the projection coefficient space by 1, using only the remaining dimensions to generate message polynomials. Since the remaining dimensions are orthogonal to the interference vector, according to an exemplary embodiment, the influence of the coherent interference may be minimized.

In an exemplary embodiment, because this technique may reduce the number of sub-channels, the power budget per channel may be proportionately increased in order to improve the information capacity per sub-channel.

PAPR Control

According to an exemplary embodiment, it may be desirable to have a SPDM system have a low average PAPR (peak-to-average power ratio) or low worst-case PAPR. In some embodiments, this may be difficult to achieve; since the $2^M$ Cairns basis functions on which SPDM is based span all polynomials of degree $2^M-1$ or less, summing the independent amplitude modulation of Cairns functions can sometimes produce polynomials with very poor PAPR performance.

According to some embodiments, PAPR may be adjusted downward by application of the default reference polynomial. However, according to an exemplary implementation of SPDM, PAPR may only be adjusted downward if the message polynomial peak appears towards the ends of the TTI, where the reference polynomial pulls down amplitudes. This may be particularly useful for taming the rising and falling exponentials. However, in the center of the TTI, the reference polynomial may by design have as little effect as possible, so that the maximum power is available for traffic. As such, alternative solutions for reducing PAPR, instead of or in addition to making use of the reference polynomial, may also be considered, as desired.

A fundamental problem for SPDM PAPR control is that the message polynomial space is very rich, and includes polynomials that, in some exemplary embodiments, may be undesirable to generate. In an exemplary embodiment, this may be solved by restricting the message polynomial space in some way. According to some exemplary embodiments of SPDM PAPR control, three methods to do so may be envisioned: paired Cairns function modulation; message re-mapping; and projection coefficient rotation. These techniques may be combined, or other techniques may also be used, as desired.

According to a first exemplary embodiment, paired Cairns function modulation may be used. According to one exemplary embodiment, the domain of allowable projection coefficients for the Cairns functions may be limited by transitioning from amplitude modulation of individual Cairns functions, as described above, to amplitude modulation of pairs of Cairns functions with approximately opposing growth patterns. For instance, in an exemplary embodiment of a SPDM system, instead of modulating $\psi_{3,0}(t)$, $\psi_{3,1}(t)$, $\psi_{3,2}(t)$, and $\psi_{3,3}(t)$ as independent sub-channels, one can modulate the sums $\psi_{3,0}(t)+\psi_{3,2}(t)$ and $\psi_{3,1}(t)-\psi_{3,3}(t)$ (see generally FIGS. 1-8). While this approach may reduce modulation degrees of freedom, it may not reduce traffic as improved PAPR performance may increase usable RMS power, allowing for more amplitude levels in the remaining sub-channels. According to some exemplary embodiments of SPDM systems, since SPDM has a huge polynomial design space available, a SPDM system may be configured to trade polynomial range for improved signal properties.

According to another exemplary embodiment, message re-mapping may be used. In an embodiment, for a given configuration of evaluation interval, available sub-channels, and available amplitude levels per sub-channel, it may also be possible to pre-generate all possible message polynomials and review their PAPR characteristics. Message polynomials with unacceptable PAPR performance could then be identified in advance, and limited or eliminated as necessary. A number of potential options for limiting or eliminating polynomials with bad PAPR exist.

For example, according to one exemplary embodiment, bad PAPR message polynomials may be prevented from being specified at run-time. However, this may impose a cross sub-channel constraint and therefore prevent independent transmission on the sub-channels, which may be undesirable in some implementations. It may also make SPDM unusable for many-to-one communication.

However, according to a second embodiment applicable to one-to-one communication channels, a transmitter may allow the sub-channels to collectively specify an unacceptable message polynomial, but then map it to an acceptable message polynomial which the transmitter and receiver have agreed in advance will be treated as equivalent. This may support a virtual sub-channel space in which each sub-channel can be modulated completely independently of the rest, combined with a physical channel that is guaranteed to maintain certain PAPR performance requirements. In an embodiment, a certain amount of the sub-channel space with good PAPR performance may have to be reserved to support the re-mapping. However, again, an SPDM system may be configured to trade polynomial design space for improved signal properties.

According to another exemplary embodiment, projection coefficient rotation may be used. Such a method may involve using a rotational technique, such as the rotational technique discussed in a previous section, to reduce PAPR by removing high-peak Taylor terms from the message polynomial generation space.

For a given joint specification of M (which, aside from determining the number of Cairns functions, also determines the highest degree Taylor term in use), the evaluation interval, and the reference polynomial, there will be some particular positive integer $n_p$ for which the Taylor term $t^{n_p}/n_p!$ produces a higher peak value than any other $t^n/n!$ over the evaluation interval. This term $t^{n_p}/n_p!$ is the biggest PAPR offender; according to an exemplary embodiment, a SPDM system may thus reduce the impact of this term or may prevent this term from being generated.

If $n_p$ is known, according to an exemplary embodiment, $t^{n_p}/n_p$ may be treated as a single-term message polynomial, and may be projected onto Cairns space. This provides the projection coefficients for the Cairns functions that collectively generate $t^{n_p}/n_p$. In an embodiment, these coefficients may then be interpreted as a vector and a technique such as the technique described in a previous section may then be used in order to ensure that $t^{n_p}/n_p$ will not be generated.

Depending on the PAPR requirements, in some exemplary embodiments, removing only $t^{n_p}/n_p$ may not be sufficient. In some exemplary embodiments, it may be necessary or desirable to remove one or more additional terms as well. This can be accomplished by repeating the rotation and dimension reduction procedure.

In some exemplary embodiments, it may not be desirable to reduce the projection coefficient space dimensionality below some point; for example, in an exemplary embodiment, a certain number of independent sub-channels may be necessary or desirable to support how the communication channel is used. According to said exemplary embodiments, a single composite vector which is a weighted sum of vectors corresponding to Taylor terms that it may be desirable to remove may be formed. This composite vector may then be removed from the Cairns projection space. In an embodiment, removing the composite vector from the Cairns projection space may reduce the maximum value producible by a message polynomial (and therefore the PAPR), although not as significantly as if the vectors summed into the composite vector were all removed individually.

In one exemplary embodiment, the term $n_p$ corresponding to the term $t^n/n!$ with the maximum peak value over the evaluation interval may be found by individually numerically evaluating all terms $t^n/n!$, for $0 \le n < 2^M$, over the evaluation interval, after convolving each individually with the reference polynomial. In some exemplary embodiments, this may not be particularly computationally expensive; in some exemplary embodiments, this may even be done during system design, rather than at run-time, if desired. In other exemplary embodiments, another technique may be used.

A discussion of which Taylor terms may, in some exemplary embodiments, be problematic may be provided. The nature of Taylor terms is that they are "weighed down" by their reciprocal factorial coefficients, so that in the interval close to zero the terms with lower degree will dominate higher-degree terms. However, further from zero the more rapid growth of the higher-degree terms dominates. A transition point between these growth terms may be identified.

To formalize this question, one can ask for the value of t at which a Taylor term first produces a larger value than the Taylor term of next lower degree. That is the t for which $$\frac{t^n}{n!} \ge \frac{t^{n-1}}{(n-1)!} \tag{12}$$

Figure 24:
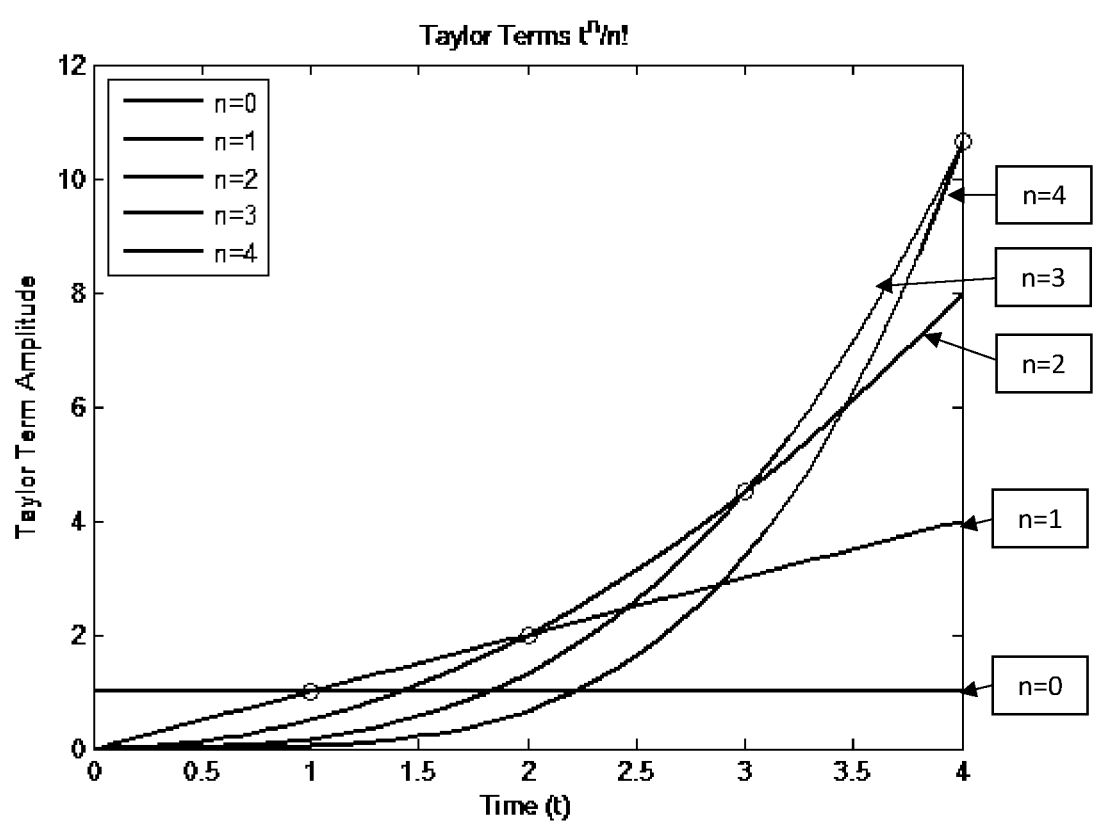
FIG. 24 may show an exemplary plot of the values at which Taylor terms first produce larger values than the Taylor terms of next lower degree (the "Taylor term amplitude cross-overs").

This occurs when $t \ge n$. By induction, this tells us that each Taylor term $t^n/n!$ will be larger than all other Taylor terms in the interval $n < t < n+1$. This trend may be shown in FIG. 24.

This means that as the evaluation interval $[-a, a]$ increases, the term $t^n/n!$ with the highest peak will be the one with the largest integer n less than a+1. If there were no reference polynomial, therefore, we would have $n_p = [a]$. An effect of the reference polynomial is to push the peak amplitude towards the middle of the evaluation interval.

Since the reference interval applies the same factor to all terms $t^n/n!$, it does not affect the relative magnitudes of the terms in any interval of t. For instance, if the maximum value produced by any Taylor term across the evaluation interval is known to have occurred at $t=2.5$, then the term that produced it can be identified as $t^2/2!$.

In an exemplary embodiment, the combination of the evaluation interval and the reference polynomial may thus be designed so that the peak value for any $t^n/n!$ occurs at a t-value that is not close to an integer. At integer t-values, there will be two terms $t^{n_q}/n_q!$ and $t^{n_{q+1}}/n_{q+1}!$ with the same value; according to an exemplary embodiment, reducing the PAPR at integer t-values may thus require removing two terms, rather than one.

According to an exemplary embodiment, for symmetry, a rough balance between the amplitudes of the Taylor terms may be achieved (even before RMS normalization). Since the amplitude of the lowest-order term $t^0/0!$ is equal to 1, in an embodiment, it may thus be desirable for the amplitude of the highest-order term to be roughly 1. For the evaluation interval [−a, a], if the highest term exponent is $x=2^M-1$, this implies that the following should be true:

$$\frac{a^x}{x!} \cong 1 \tag{13}$$

$$a \cong \sqrt[x]{x!} \tag{14}$$

Other techniques to control PAPR, including evaluation interval restriction and Cairns function removal, may also be understood. In some exemplary embodiments, these techniques may be less effective at controlling PAPR than other techniques or may be more situationally useful than other techniques, but may be, for example, employed when controlling PAPR is less of a concern or in a situation where they are useful, or may be employed in combination with another technique, as desired.

For example, according to an exemplary embodiment, evaluation interval restriction may be used. In an exemplary embodiment of evaluation interval restriction, peak size may be controlled within SPDM by shrinking the evaluation interval around t=0, so that the exponential amplitude change that is characteristic of Cairns functions has little scope to produce high peaks. However, according to an exemplary implementation, this may reduce RMS power as well as peak size. Because of this, and because exponential shape is scale-invariant, such an adjustment may not change PAPR. According to some exemplary embodiments, whatever the evaluation interval, SPDM may be capable of generating all polynomials up to degree $2^M-1$ within that interval, including ones with bad PAPR properties.

So, in one exemplary embodiment, the evaluation interval may be shortened, causing the RMS power to be reduced, which may reduce the signal-to-noise ratio and therefore may increase transmission errors. In another exemplary embodiment, the shortened interval may be re-normalized to increase RMS power, which may cause the reappearance of the peaks. These adjustments may be made in combination with other adjustments, if desired.

According to another exemplary embodiment, Cairns function removal may be used. In an exemplary embodiment, PAPR may be limited by limiting the polynomial space of SPDM to polynomials exhibiting good PAPR properties, for example by limiting the domain of allowable projection coefficients for the Cairns functions. This may entail, for example, determining which Cairns function has the worst PAPR performance over the evaluation interval (after convolving with the reference polynomial) and removing that Cairns function from the sub-channel space in order to reduce over-all PAPR.

However, in some exemplary embodiments, this approach may be difficult to implement. The Cairns functions may belong to families with distinct but related properties. For instance, all Cairns functions $\psi_{m,n}(t)$ with even n are symmetric around zero, and with odd n are anti-symmetric around zero. This means that sets of Cairns functions may have peaks near the same points, and in some cases it may be difficult to exclude these function sets.

Instantaneous Spectral Analysis Overview

According to some exemplary embodiments, traditional signal modulation techniques such as QAM and PSK may transmit signals which are the sum of sinusoidals of constant amplitude over a symbol period. Bandwidth usage can be measured within this approach using a Fourier transform, which represents a time domain amplitude sequence in terms of sinusoidals with constant amplitude.

However, according to an exemplary embodiment, if this approach were used for SPDM, the result would be very high bandwidth usage. Arbitrary polynomials do not have concise bandwidth representations in terms of sinusoidals with constant amplitude.

For instance, according to an exemplary embodiment, if the SPDM basis polynomials are of degree 15, then in 1 TTI they transmit 16 independent amplitude values. If the TTI duration is 1 microsecond, then, according to the sampling theorem, at least 8 MHz would be necessary to represent the transmission polynomial. In practice, according to some exemplary embodiments, a Fourier transform of an SPDM transmission polynomial may generally imply much greater spectral occupation than this.

However, Shannon's proof of the sampling theorem uses a Fourier transform (FT). This proof thereby implicitly assumes the spectrum to be stationary over the evaluation interval (i.e., representable by sinusoidals with constant amplitude).

In an exemplary embodiment, the instantaneous spectral analysis (ISA) technique may allow for transmission of SPDM polynomials using sinusoidals with continuously-varying amplitude. This means that, regardless of the degree of the transmission polynomial, the range of frequencies B necessary to transmit a sufficient number of points to uniquely specify the polynomial can always be made equal to 1/T, where T is the TTI duration. For instance, for the example given above in which at minimum 8 MHz are necessary to transmit a polynomial of degree 15 using sinusoidals with constant amplitude according to an FT, within ISA only 1 MHz is necessary.

According to an exemplary embodiment, when additional detail is added to the time domain amplitude sequence (represented here by increasing polynomial degree) the FT responses by using higher frequencies to "paint in" the additional detail. However, according to an alternative exemplary embodiment, the ISA may instead respond by adding additional sinusoidals with continuously-varying amplitude within the same B=1/T frequency range.

Some initial discussion of the differences between the FT and the ISA may be warranted. The FT and the ISA can be viewed as two different basis sets for representing a time-domain amplitude sequence. Which gives the "correct" representation of the occupied bandwidth depends how the amplitude sequence is actually transmitted. If the amplitude sequence is transmitted using sinusoidals with constant amplitude, then the FT correctly reports where power is placed in the spectrum. If the amplitude sequence is instead transmitted using the ISA-generated specification for the amplitude sequence, then ISA correctly reports where power is placed in the spectrum.

In an exemplary embodiment, a definition of bandwidth usage that is independent of choice of basis (in particular, those of the FT or ISA) may be formulated. The economic value of spectrum is tied to how closely channels can be packed together before they interfere with each other. This suggests that bandwidth occupation should ultimately be measured in terms of a channel interference test.

Instantaneous Spectral Analysis

According to an exemplary embodiment, ISA may be used to convert a sequence of amplitude values (the "time domain") into an equivalent sum of sinusoidals with continuously-varying amplitude. By contrast, FT converts the time domain into a sum of sinusoidals with constant amplitude.

According to an exemplary embodiment, for a particular amplitude sequence, $B_F$ may be defined to be the range of sinusoidal frequencies occupied by the FT, and $B_I$ may be defined to be the range of sinusoidals with non-zero power as determined by ISA.

Some further discussion of the key differences between ISA and the FT may be provided.

First, since the FT represents an amplitude sequence with a basis set of sinusoidals having constant amplitude, it assumes an evaluation period over which the spectrum is stationary; that is, over which the power assigned to particular frequencies is constant. This assumes that the source of the amplitude sequence is Linear Time-Invariant (LTI). ISA does not require an LTI source.

Second, the FT effectively averages spectral information over its evaluation period to produce constant sinusoidal amplitudes. In an exemplary embodiment, ISA may be capable of determining continuously-varying sinusoidal amplitudes at every instant in time (hence the name, "Instantaneous Spectral Analysis").

Third, for the FT, the maximum rate at which independent amplitude values can be transmitted may be equal to the Nyquist rate of $f_N=2B_F$. For the ISA, in an exemplary embodiment, there may be no inherent upper bound in terms of $B_I$ on the rate at which independent amplitude values can be transmitted. ISA holds this advantage over the FT because Shannon's proof of the sampling theorem, from which the Nyquist rate derives, assumes that the spectrum is stationary over the evaluation interval, which is an assumption that ISA violates.

Stating the above point in a different way, using ISA, it may be possible to transmit a sequence of amplitude values in a given amount of time using a smaller range of frequencies than is possible with the FT representation.

To summarize, effectively, for a given amplitude sequence time duration, the FT responds to a higher level of detail in the amplitude sequence by utilizing higher frequencies (increasing $B_F$). ISA responds by increasing the density of sinusoidals within a constant $B_I$.

While the output of the FT may be referred to as the frequency domain, it may alternatively be understood as a frequency domain; it provides one possible representation of the time domain in terms of sinusoidals with constant amplitude. ISA provides a different frequency representation in terms of sinusoidals with continuously-varying amplitude. As both FT and ISA represent occupied bandwidth differently, this raises the question of how occupied bandwidth should be envisioned and represented.

The answer is that it depends on how the time domain was generated. If the source was LTI over the evaluation interval, as with ideal transmitters for traditional modulation techniques that generate sinusoidals with constant amplitude, then the FT representation is correct.

However, ISA provides a recipe for generating a non-LTI signal source that will dramatically reduce the necessary range of frequencies for transmission; for such a source, the FT representation is incorrect.

Practically, bandwidth measurement matters because it affects how closely channels can be packed together without inter-channel interference; the differences between FT and ISA may amount to differences in channel packing.

In an exemplary embodiment, ISA may be implemented based on the following steps. First, a polynomial of interest may be identified. In some embodiments, this may entail, for example, constructing the polynomial through amplitude modulation of a polynomial basis set, for example as previously described. In other embodiments, this may entail fitting a polynomial to an amplitude sequence, such as a time domain input sequence of real-valued amplitudes. Second, the polynomial may be projected onto the Cairns series functions. Third, the Cairns series functions may be converted to the Cairns exponential functions. Last, frequency information contained within the Cairns exponential functions may be combined to identify a sum of sinusoidals with continuously time-varying amplitudes.

The essential idea behind ISA is to represent the signal time domain as a polynomial, and then to apply a technique to decompose the signal polynomial into Cairns functions, from which time-varying sinusoidal amplitude information can be determined. The Cairns functions may be described by, for example, Equations (4) and (8) and Table 3, appearing in a previous section.

Referring back to table 3, table 3 shows that the $\psi_{m,n}(t)$ coefficients define a set of orthogonal vectors. More precisely, if M is a positive integer, then the vectors formed from the first $2^M$ coefficients of the functions $\psi_{m,n}(t)$ for $0 \leq m \leq M$ constitute a set of orthogonal basis vectors for a $2^M$-dimensional space. These can be normalized to produce the orthonormal "$2^M$ Cairns basis vectors".

The existence of the $2^M$ Cairns basis vectors implies that any Taylor polynomial P of degree $k<2^M$ can be orthogonally projected onto polynomials formed from the first $2^M$ terms of the Cairns series functions. This occurs simply by taking the inner product of P's coefficients with the $2^M$ Cairns basis vectors. The resulting coefficients for each Cairns basis function are referred to as the "projection coefficients" $c_{m,n}$, also discussed in a previous section.

The first $2^M$ terms of the Cairns series functions $\psi_{m,n}(t)$ are only an approximation to the full infinite series expansion of the $\psi_{m,n}(t)$. However, the error in the approximation is $O(t^{(2^M)})$, with a reciprocal factorial coefficient, and therefore falls off very rapidly as M increases. According to an exemplary embodiment, high-degree polynomials may thus be projected onto the $\psi_{m,n}(t)$ by this procedure with little error.

While spectral usage is not readily apparent from the $\psi_{m,n}(t)$ representation, it can be determined precisely, and on an instant-by-instant basis, from the equivalent $E_{m,n}(t)$. Essentially, projection onto $\psi_{m,n}(t)$ allows decomposition of a polynomial, and then representing it as $E_{m,n}(t)$ allows the generation of an equivalent set of sinusoidals with continuously-varying amplitude.

Each $E_{m,n}(t)$ can be expressed as a sum of products, in which each term is the product of a phase-adjusted real-valued exponential with a complex circle. In some embodiments, the real-valued exponentials may be either rising or decaying, and may have different growth constants in the exponent. The complex circles may rotate in either direction, and with different frequencies.

By viewing the real-valued exponentials as continuously time-varying coefficients applied to sinusoidals, an approach to defining instantaneous spectrum can be established. At any particular time, the sum of the real-valued exponentials applied to complex circles of the same frequency may define the spectral usage at that particular frequency at that particular time.

In more detail, by using the Euler's formula identity $e^{i\pi/2}=i$ it is possible to represent $E_{m,n}(t)$ as $$E_{m,n}(t) = \frac{1}{\lceil 2^{m-1}\rceil} \sum_{p=0}^{\lceil 2^{m-1}\rceil-1} i^{-n(2p+1)2^{2-m}} e^{t \cdot \cos(\pi(2p+1)2^{1-m})} e^{i \cdot t \cdot \sin(\pi(2p+1)2^{1-m})} \quad (15)$$

In the above equation (15), the phase may be determined by $i^{-n(2p+1)2^{2-m}}$, the amplitude by $e^{t \cdot \cos(\pi(2p+1)2^{1-m})}$, and the frequency by $e^{i \cdot t \cdot \sin(\pi(2p+1)2^{1-m})}$.

In an embodiment, the instantaneous spectral information can be found by summing the phase-weighted amplitude information associated with each frequency.

Several points should be noted. First, for m=0 and m=1, the frequency factor is equal to the constant 1. Second, for m≥2, no two distinct m levels may contain the same frequencies, since $\sin(\pi(2p+1)2^{1-m})$ depends on m. Third, the same frequency appears in $E_{m,n}(t)$ for every n at level m, since $\sin(\pi(2p+1)2^{1-m})$ does not depend on n. Fourth, since both $\sin(\pi(2p+1)2^{1-m})$ and $\cos(\pi(2p+1)2^{1-m})$ can switch signs depending on the value of p, it follows that for m≥2 each positive frequency will be matched by an equal negative frequency, and that for m≥3 each positive and negative frequency will appear with both a rising and falling exponential as its real-valued amplitude coefficient.

According to an exemplary embodiment, in order to find the instantaneous amplitude of each frequency, all terms that have the same frequency may be algebraically assembled. Since, as noted above, the frequency factor does not depend on n, the same frequency information may appear in all $E_{m,n}(t)$ functions having the same m. Phase-adjusted terms may thus be summed across n values at the same m level.

Since a particular frequency is fully-determined by the combination of its m and p values, a given frequency may be denoted by $f_{m,p}$ and its amplitude at a particular time by $a_{m,p}(t)$. This may yield the following equation:

$$a_{m,p}(t) = \frac{1}{\lceil 2^{m-1}\rceil} \sum_{n=0}^{\lceil 2^{m-1}\rceil-1} c_{m,n} i^{-n(2p+1)2^{2-m}} e^{t \cdot \cos(\pi(2p+1)2^{1-m})} \quad (16)$$

This equation may provide the instantaneous frequency amplitudes associated with the polynomial P at every distinct time t over its evaluation interval. As noted above, for m≥3 each frequency will appear twice, associated with each of a rising and decaying exponential amplitude. In an exemplary embodiment, these paired amplitudes may be summed together.

A detail is that the projection coefficients $c_{m,n}$ were found by projecting Taylor coefficients onto the $\psi_{m,n}(t)$ normalized by their number of non-zero terms, as described above. However, the above equation shows the reconstruction of the projected polynomial from $E_{m,n}(t)$ terms that have not been normalized in this way. Since $E_{m,n}(t)=\psi_{m,n}(t)$, in an exemplary embodiment, the same projection normalization factor as applied to the $\psi_{m,n}(t)$ must be applied for matched m, n values; this was left out for readability.

Instantaneous Spectral Analysis Detailed Operations

Exemplary embodiments of each of the high-level steps provided above may be provided. For reference, according to an exemplary embodiment, ISA may be implemented based on the following steps. First, a polynomial may be fit to the time domain input sequence of real-valued amplitudes. Second, the polynomial may be projected onto the Cairns series functions. Third, the Cairns series functions may be converted to the Cairns exponential functions. Last, frequency information contained within the Cairns exponential functions may be combined to identify a sum of sinusoidals with continuously time-varying amplitudes.

According to an exemplary embodiment, in a first step, a standard technique may be used for fitting a polynomial to a sequence of signal amplitude values. In some embodiments, ISA does not depend on which method is used, and any of several methods may be used. Certain considerations may apply, such as whether to produce a high-order polynomial that exactly fits the data sequence, or a lower-order polynomial that is an adequate fit but perhaps better captures the underlying pattern. However, in each case, a polynomial may be provided that represents the time domain amplitude sequence.

For illustrative purposes, FIG. 25 provides MATLAB® code to generate a polynomial of arbitrarily chosen 25th degree, with random Taylor coefficients between −10 and 10.

According to an exemplary embodiment, in a second step, a polynomial P representing the signal time-domain data may be converted into a weighted sum of Cairns series functions.

First, P may be converted into a Taylor polynomial by multiplying through by the factorial of each term's power. In the MATLAB code sample shown in FIG. 26, a polynomial is represented as a row vector of coefficients called poly_coefficients, with the highest power on the left. The resulting Taylor_coefficients represents the same polynomial with the factorials implicit.

According to an exemplary embodiment, code such as that shown in FIG. 26 may be capable of handling a matrix in which each row represents a distinct polynomial. However, according to another exemplary embodiment, it may be sufficient to handle matrices in which a single row is present.

In the embodiment shown in FIG. 26, to shorten the notation, "Taylor_coefficients" may be referred to equivalently as "Taylor_vec" below.

Next, according to an exemplary embodiment, if necessary or desired, "Taylor_vec" may be padded with minimum-value high-term coefficients so that the number of coefficients is a power of two, i.e. $2^M$ for positive integer M. This may be shown in exemplary FIG. 27.

In an exemplary embodiment, a Cairns projection matrix may then be constructed. FIG. 28 shows an exemplary embodiment of MATLAB code that may be used to find the normalization coefficient for each row of the Cairns projection matrix. FIG. 29 then shows an exemplary embodiment of MATLAB code that may be used to, given the normalization coefficients, generate the Cairns projection matrix.

Given the Cairns projection matrix, a Taylor polynomial can be projected onto Cairns space, for example by simple matrix multiplication. FIG. 30 shows an exemplary embodiment of code that may be used to produce a row vector in which each row is the coefficient for a Cairns series function.

According to an exemplary embodiment, in a third step, Cairns series functions may be converted to Cairns exponential functions. Because of the identity $\psi_{m,n}(t)=E_{m,n}(t)$, the conversion from Cairns series functions to Cairns exponential functions may be automatic. The projection coefficient for each $\psi_{m,n}(t)$ may simply be applied to the corresponding $E_{m,n}(t)$.

However, because each $\psi_{m,n}(t)$ was normalized as described above, in an embodiment, the same normalization factors must be applied to the $E_{m,n}(t)$. FIG. 31 shows an exemplary embodiment of MATLAB code providing this conversion, in which these normalization coefficients are held in the proj_norm row vector.

According to an exemplary embodiment, in a fourth step, frequency information may be combined. FIG. 31 shows an exemplary embodiment of MATLAB code combining amplitude information associated with each frequency by summing across $E_{m,n}(t)$ n-values. Note that the amplitudes are time dependent (specified by the evaluation time t).

In the exemplary MATLAB code displayed in FIG. 31, the function mn_to_row_index may convert from a pair of m, n values to the corresponding matrix index. This function may be defined in FIG. 32, which may show an exemplary embodiment of MATLAB code that may be used to convert from a pair of m, n values to the corresponding matrix index.

In an exemplary embodiment, frequency values may be provided in such a way that they are interleaved across m-levels. FIG. 33 displays an exemplary embodiment of MATLAB code that may be used to sort frequencies.

Next, for each frequency, the rising and decaying exponential amplitudes may be added. In the process, the frequency vectors may be shortened. FIG. 34 displays an exemplary embodiment of MATLAB code that may be used to combine amplitude pairs.

In the exemplary embodiment shown in FIG. 34, instantaneous frequency and amplitude information may be stored in short_req_idx and short_req_amp, respectively.

In an exemplary embodiment, the instantaneous spectral information found above can be used to reconstruct the time domain at a particular time value t. FIG. 35 displays an exemplary embodiment of MATLAB code that may be used to reconstruct the time domain.

In an exemplary embodiment, the accuracy of the reconstruction may increase with the degree of the polynomial representing the signal, since the projection onto Cairns space becomes more precise with longer polynomials. For instance, for a random $25^{th}$ degree polynomial maximum percentage reconstruction ratio errors are less than $10^{-10}$.

Figure 36:
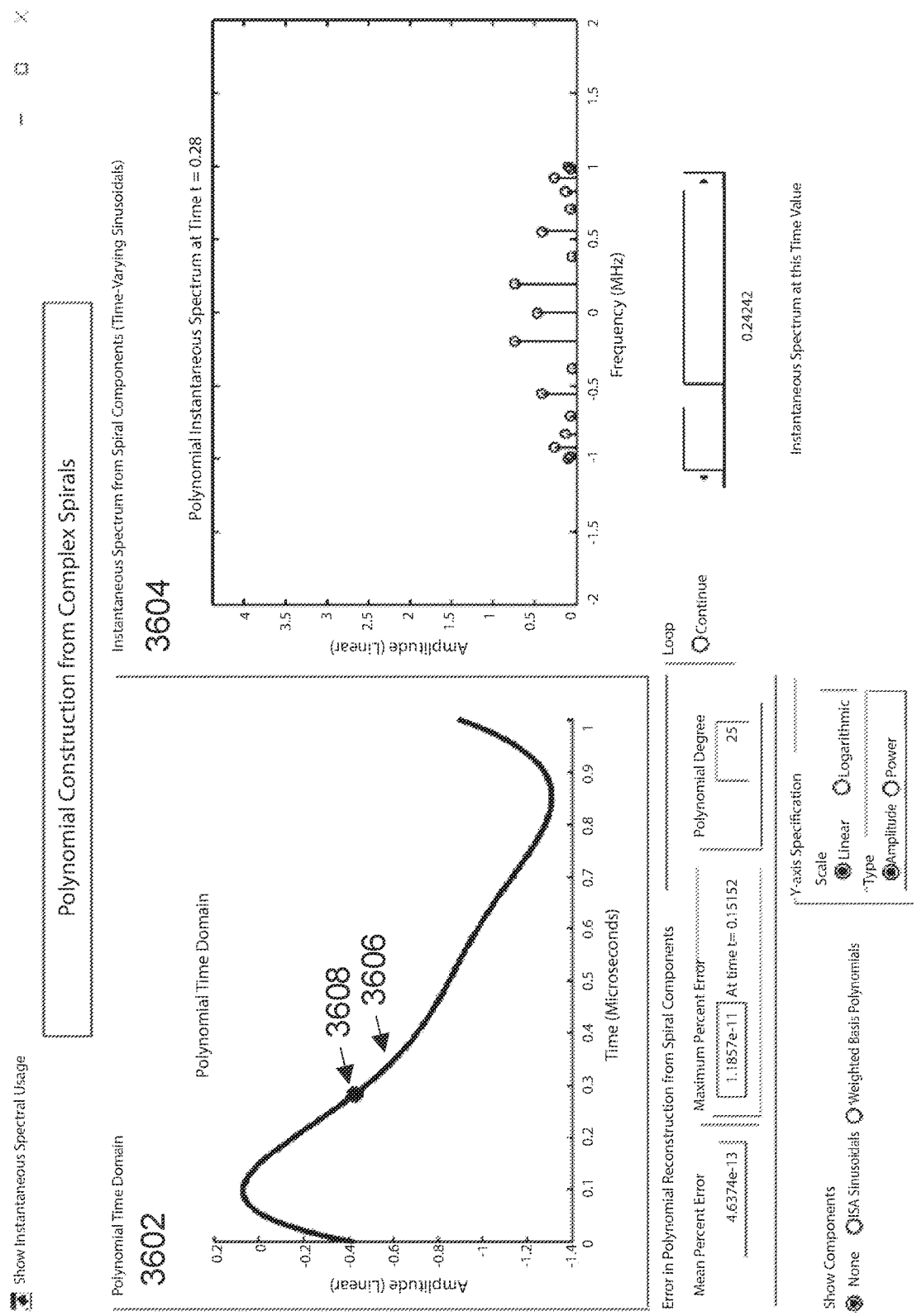
FIG. 36 may show exemplary time domain and frequency domain plots for a random $25^{th}$ degree Taylor polynomial and its instantaneous spectrum.

FIG. 36 shows an exemplary plot of the time domain for a random $25^{th}$ degree Taylor polynomial in the left panel 3602, and its instantaneous spectrum (calculated using the technique given here) in the right panel 3604, at the arbitrarily-chosen time value of t=0.28.

In FIG. 36, the curve 3606 in the left panel 3602 shows a random Taylor polynomial of degree 25. The blue dot 3608 is the ISA reconstruction of the polynomial at t=0.28, with the right panel 3604 showing the instantaneous sinusoidal amplitudes at that time.

According to the exemplary embodiment shown in FIG. 36, the maximum ratio percentage error in the ISA reconstruction of the polynomial across the entire evaluation interval may be $1.2*10^{-11}$, and the mean reconstruction error may be $4.6*10^{-13}$.

It may be noted from FIG. 36 that, as shown in the left panel 3602, the simulated transmission time duration T is 1 microsecond. It may also be noted from FIG. 36 that, as shown in the right panel 3604, the range of frequencies B in which ISA puts power is exactly 1 MHz. Since a random $25^{th}$ degree polynomial transmits 26 independent amplitude values, the number of amplitude values that can be transmitted in this way is 26BT. This is 13 times higher than the 2BT limit provided by the sampling theorem on the assumption (which ISA breaks) that the spectrum is stationary over the transmission interval.

Figure 37:
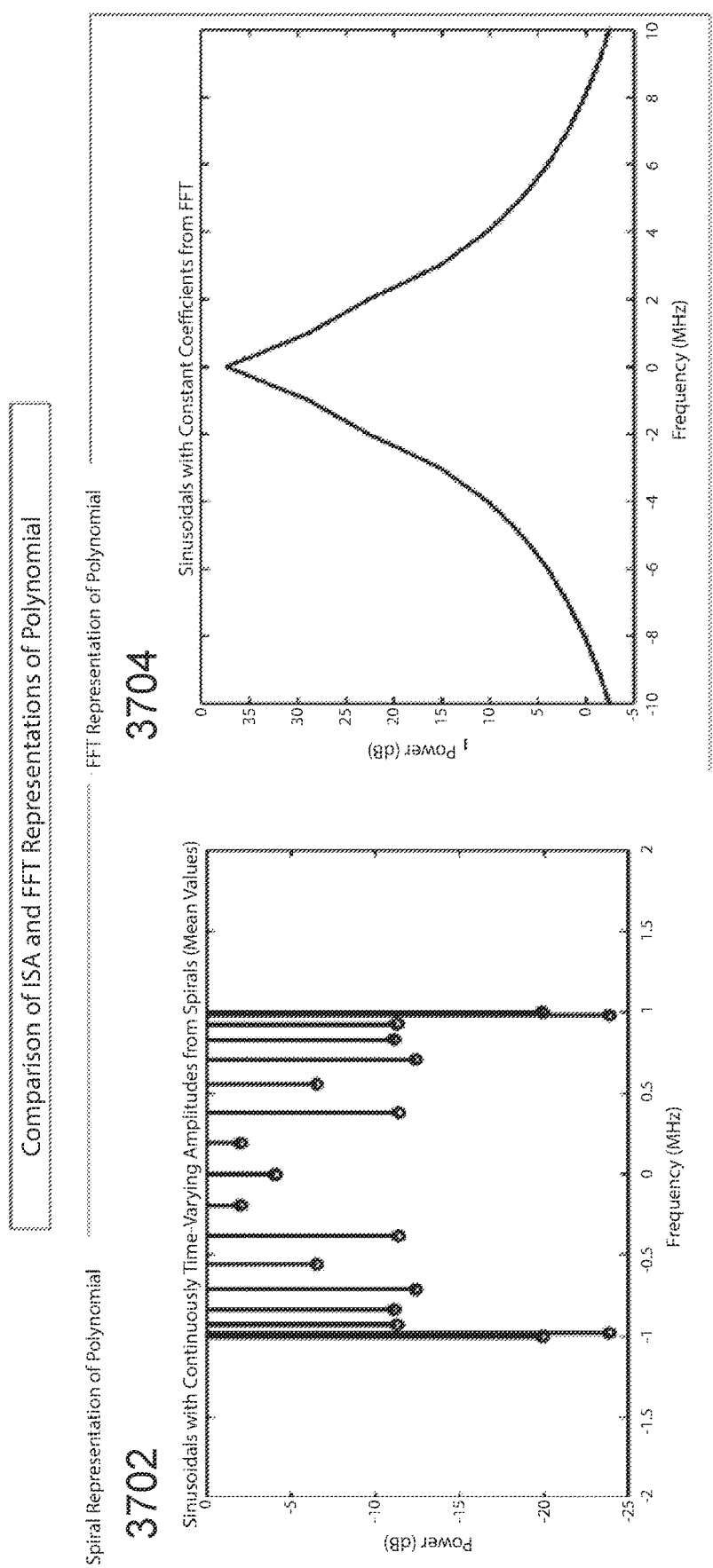
FIG. 37 may show an exemplary comparison of ISA and FT spectral usage.

This difference is apparent from comparing the mean ISA spectral power with the FT of the amplitude sequence generated by the random $25^{th}$ degree polynomial. FIG. 37 displays an exemplary comparison between the mean ISA spectral power with the FT of the amplitude sequence generated by the random $25^{th}$ degree polynomial. In the exemplary embodiment shown in FIG. 37, as shown in the left panel 3702, all ISA power is placed within the 1 MHz range. The FT in the right panel 3704 is on a frequency larger scale, showing only a roughly 40 dB roll-off at 10 MHz.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method comprising:
   converting a polynomial representing data into a set of sinusoidals with time varying amplitude, each of the sinusoidals having a different frequency;
   combining the set of sinusoidals with time-varying amplitude into a signal; and
   transmitting, with a transmitter, the signal.

2. The method of claim 1, wherein converting includes:
   projecting the polynomial onto Cairns series functions; and
   converting the Cairns series functions to Cairns exponential functions; and
   combining the Cairns exponential functions based on frequency information to produce the set of sinusoidals with continuously time-varying amplitude.

3. The method of claim 1, wherein converting includes:
   fitting the polynomial to a sequence of amplitude values.

4. The method of claim 1, wherein:
   the set of sinusoidals has a range of frequencies B less than or equal to 1/T, where T is a Transmission Time Interval of the signal.

5. The method of claim 1, further comprising:
   receiving, with a receiver, the signal.

6. The method of claim 5, wherein receiving the signal comprises detecting the polynomial.

7. The method of claim 1, wherein the polynomial is expressed as a Taylor series polynomial.

8. A system comprising:
   a transmitter configured to transmit a signal, wherein the signal is generated by:
     converting a polynomial representing data into a set of sinusoidals with time-varying amplitude, each of the sinusoidals having a different frequency; and
     combining the set of sinusoidals with time-varying amplitude into the signal; and
   a receiver configured to receive the signal.

9. The system of claim 8, wherein converting the polynomial includes:
projecting the polynomial onto Cairns series functions;
converting the Cairns series functions to Cairns exponential functions; and
combining the Cairns exponential functions based on frequency information to produce the set of sinusoidals with continuously time-varying amplitude.

10. The system of claim 8, wherein converting includes:
fitting the polynomial to a sequence of amplitude values.

11. The system of claim 10, wherein
the set of sinusoidals has a range of frequencies B less than or equal to 1/T, where T is a Transmission Time Interval of the signal.

12. The system of claim 8, where the polynomial is expressed as a Taylor series polynomial.

13. The system of claim 8, wherein at least one of converting the polynomial and combining the set of sinusoidals occurs in the transmitter.

14. A non-transitory computer readable medium storing program code comprising one or more instructions, which, when executed by one or more processors, cause the one or more processors to:
convert a polynomial representing data into a set of sinusoidals with time-varying amplitude, each of the sinusoidals having a different frequency;
combine the set of sinusoidals with time-varying amplitude into a signal; and
transmit the signal via a transmitter.

15. The non-transitory computer readable medium of claim 14, wherein the program code further comprises instructions which, when executed by the one or more processors, cause the one or more processors to convert the polynomial by performing steps of:
projecting the polynomial onto Cairns series functions;
converting the Cairns series functions to Cairns exponential functions; and
combining the Cairns exponential functions based on frequency information to produce the set of sinusoidals with continuously time-varying amplitude.

16. The non-transitory computer readable medium of claim 14, where the set of sinusoidals has a range of frequencies B less than or equal to 1/T, where T is a Transmission Time Interval of the signal.

17. The non-transitory computer readable medium of claim 14, wherein the program code further comprises instructions which, when executed by the one or more processors, cause the one or more processors to:
receive a transmitted signal;
wherein the transmitted signal comprises a combined second set of sinusoidals with time-varying amplitude, each of the sinusoidals having a different frequency; and
wherein the combined second set of sinusoidals comprises a converted second polynomial representing second data.

18. The non-transitory computer readable medium of claim 14, wherein converting includes:
fitting the polynomial to a sequence of amplitude values.

19. A device comprising:
a receiver configured to receive an input signal including data, and further configured to provide an output signal including the data in the input signal;
wherein the input signal comprises a combined set of sinusoidals with time varying amplitude, each of the sinusoidals having a different frequency; and
wherein the combined set of sinusoidals comprises a converted polynomial representing the data.

20. The device of claim 19, where the receiver is further configured to demultiplex the signal into the converted polynomial.

21. The device of claim 19, where the receiver is further configured to apply a minimum distance metric to identify the converted polynomial.

* * * * *